(12) United States Patent
Haneda et al.

(10) Patent No.: US 7,340,609 B2
(45) Date of Patent: Mar. 4, 2008

(54) DATA TRANSFORM METHOD AND APPARATUS, DATA PROCESSING METHOD AND APPARATUS, AND PROGRAM

(75) Inventors: Naoya Haneda, Tokyo (JP); Kyoya Tsutsui, Kanagawa (JP)

(73) Assignee: Sony Corporation, Tokyo (JP)

( * ) Notice: Subject to any disclaimer, the term of this patent is extended or adjusted under 35 U.S.C. 154(b) by 819 days.

(21) Appl. No.: 10/650,443

(22) Filed: Aug. 28, 2003

(65) Prior Publication Data

US 2004/0105544 A1 Jun. 3, 2004

(30) Foreign Application Priority Data

Aug. 30, 2002 (JP) .............................. 2002-253357

(51) Int. Cl.
*H04L 15/06* (2006.01)
*H04L 9/06* (2006.01)
*H04L 9/34* (2006.01)

(52) U.S. Cl. .................... 713/176; 713/193; 705/57

(58) Field of Classification Search ........ 713/165–167, 713/176, 193; 705/57–59
See application file for complete search history.

(56) References Cited

U.S. PATENT DOCUMENTS

| | | | | |
|---|---|---|---|---|
| 4,791,565 A | * | 12/1988 | Dunham et al. ............... | 726/31 |
| 5,343,526 A | * | 8/1994 | Lassers ......................... | 705/59 |
| 5,717,821 A | | 2/1998 | Tsutsui et al. | |
| 5,758,069 A | * | 5/1998 | Olsen .......................... | 726/27 |
| 6,081,784 A | | 6/2000 | Tsutsui | |
| 6,952,820 B1 | * | 10/2005 | Schultz et al. ............... | 717/151 |
| 2002/0154775 A1 | * | 10/2002 | Yang ........................... | 380/236 |
| 2003/0187801 A1 | * | 10/2003 | Chase et al. .................. | 705/59 |
| 2004/0049378 A1 | * | 3/2004 | Takamizawa et al. ........ | 704/205 |

FOREIGN PATENT DOCUMENTS

| | | |
|---|---|---|
| JP | 10-135944 | 5/1998 |
| JP | 2001-103047 | 4/2001 |
| JP | 2001-282258 | 10/2001 |
| JP | 2001-325460 | 11/2001 |

(Continued)

OTHER PUBLICATIONS

R.E. Crochiere et al., "Digital Coding of Speech in Subbands," The Bell System Technical Journal, Oct. 1974, pp. 1069-1085, vol. 55, No. 8.

(Continued)

*Primary Examiner*—Gilberto Barron, Jr.
*Assistant Examiner*—Venkat Perungavoor
(74) *Attorney, Agent, or Firm*—Finnegan, Henderson, Farabow, Garrett & Dunner, L.L.P.

(57) ABSTRACT

When sample data is played back, audio guide data G1 and G2 and subsequent frame data are played back based on usage license information L1 contained in the sample data. When high-quality data is generated, the audio guide data G1 and G2 and the usage license information L1 are overwritten based on usage license information L2 contained in additional data. When the high-quality data is played back, audio guide data G1' and G2' and subsequent frame data are played back based on usage license information L3. A user is then able to identify the playback status of the sample data or high-quality data by listening to an audio guide.

17 Claims, 28 Drawing Sheets

FOREIGN PATENT DOCUMENTS

WO    WO 94/28633    8/1994

OTHER PUBLICATIONS

J. H. Rothweiler, "Polyphase Quadrature Filters—A New Subband Coding Technique," ICASSP 83, pp. 1280-1283, Boston.

J.P. Princen et al.,"Subband/Transform Coding Using Filter Bank Designs Based on Time Domain Aliasing Cancellation," ICASSP 1987, pp. 2161-2164.

R. Zelinski et al., "Adaptive Transform Coding of Speech Signals," IEEE Transactions of Acoustics, Speech, and Signal Processing, Aug. 1977, vol. ASSP-25, No. 4, pp. 299-309.

M.A. Kransner, "The Critical Band Coder—Digital Encoding of Speech Signals Based on the Perceptual Requirements of the Auditory System," ICASSP 1980, pp. 327-331.

ISO/IEC 11172-3, Jan. 8, 1993, first edition.

D.A. Huffman, "A Method for Construction of Minimum Redundancy Codes," Proceedings of the I.R.E., Sep. 1952, pp. 1098-1101.

* cited by examiner

FIG. 14
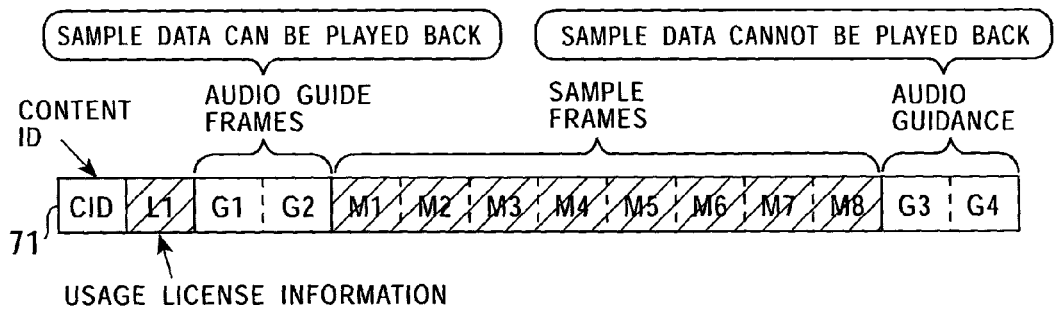
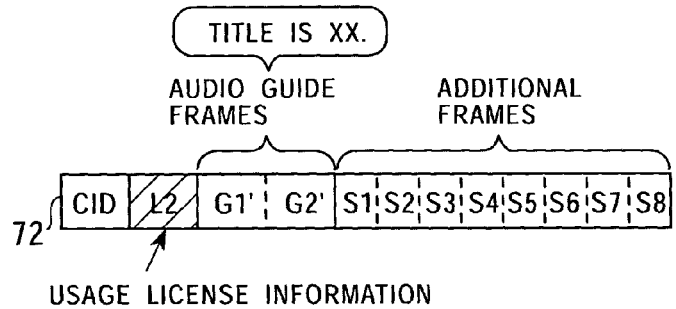
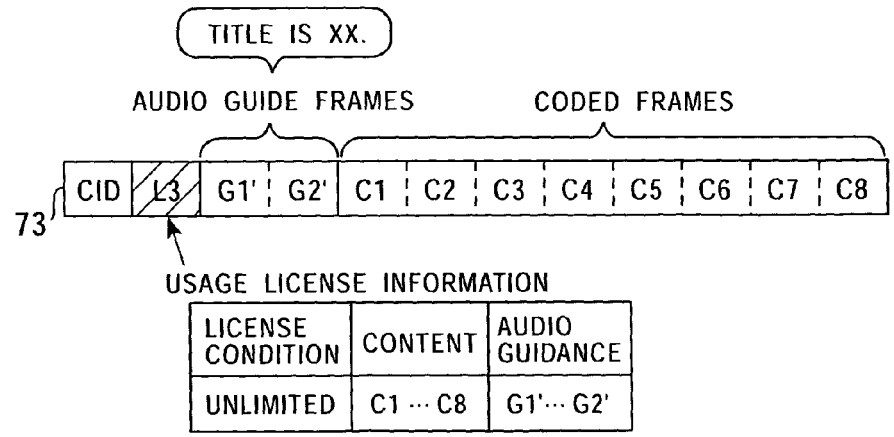

DATA TRANSFORM METHOD AND APPARATUS, DATA PROCESSING METHOD AND APPARATUS, AND PROGRAM

BACKGROUND OF THE INVENTION

1. Field of the Invention

The present invention relates to data transform methods and apparatuses, data processing methods and apparatuses, and programs. More particularly, the invention relates to a data transform method and apparatus, a data processing method and apparatus, and a program therefor, which are suitable for distributing sample data (trial data) of content to users.

2. Description of the Related Art

Due to widespread use of communication network technologies including the Internet, improvements in information compression techniques, and enhanced integration or density of information recording media, pay distribution of digital content including various multimedia data, such as audio, still images, moving pictures, and a combination of audio and moving pictures, for example, movies, to users are conducted via communication networks.

A store that sells package media, such as compact disks (CDs) or mini-disks (MDs) (trademark), that is, recording media in which digital content is recorded, is installed with an information terminal, a so-called multimedia kiosk (MMK), in which many pieces of digital content including music data are stored. This enables the store not only to sell package media, but also to sell digital content.

A user brings a recording medium, such as an MD, and inserts it into the MMK. The user then selects the title of digital content to be purchased by referring to a menu screen, and pays for the content. Payment may be made by cash, electronic money, or electronic settlement by a credit card or a prepaid card. The MMK records the selected digital content data on the recording medium inserted by the user by performing predetermined processing.

As described above, digital content sellers can sell digital content by using the MMK, and can also distribute digital content to users via, for example, the Internet.

Content can be distributed more effectively not only by selling package media having content recorded thereon, but also by selling digital content itself.

In order to distribute digital content while protecting the copyright, techniques, for example, those disclosed in Japanese Unexamined Patent Application Publication Nos. 2001-103047 and 2001-325460 can be used. Portions of digital content other than portions that are permitted to preview or listen to on a trial basis are encrypted, and the digital content is distributed. Then, only users who have purchased a decryption key for the corresponding encryption are permitted to preview or listen to the entire content. As a known encryption method, the initial value of a random number sequence is given to a bit string of a pulse code modulation (PCM) digital audio signal as a key signal, and a bit string obtained by performing an exclusive-OR of the generated 0/1 random number sequence and the above-described PCM bit string is used as an encrypted bit stream. The digital content encrypted as described above is recorded on a recording medium by using, for example, the above-described MMK, or is transmitted via a network to be distributed to a user. Unless the user who has obtained the digital content data has a key, the user is only permitted to preview or listen to an unencrypted portion. If the encrypted portion is played back without being decrypted, only noise is heard.

There have been improvements in techniques for compressing audio data and broadcasting it, distributing audio data via a network, and recording compressed data on various recording media, such as magneto-optical disks.

There are various techniques for coding audio signals with high efficiency. For example, in a block-less frequency-band division technique, i.e., a so-called "sub-band coding (SBC)", an audio signal in the time domain is divided into a plurality of frequency bands and coded without dividing them into blocks. In a block frequency-band division technique, i.e., a so-called "transform coding", a signal in the time domain is transformed (spectrum transform) into a signal in the frequency domain so as to be divided into a plurality of frequency bands. The signal components are then coded in each band. Another high-efficiency coding technique, which is a combination of the above-described sub-band coding and transform coding, has also been considered. In this case, for example, after sub-band division is performed in the above-described SBC, signal components in each sub band are transformed into signal components in the frequency domain, and are then coded in each band.

Filters used in the above-described high-efficiency coding methods include quadrature mirror filters (QMF), details of which are described in R. E. Crochiere, "Digital Coding of Speech in Subbands" (Bell Syst. Tech. J., vol. 55, No. 8, 1974). An equal-bandwidth filtering technique is described in Joseph H. Rothweiler, "Polyphase Quadrature Filters—a New Subband Coding Technique" (ICASSP 83, BOSTON).

As the above-described spectrum transform, for example, an input audio signal is formed into blocks in predetermined time units (frames), and discrete Fourier transform (DFT), discrete cosine transform (DCT), or modified DCT (MDCT) is performed on the signal components in each block, thereby transforming a time-domain signal into a frequency-domain signal. Details of MDCT are described in J. P. Princen and A. B. Bradley, (Univ. of Surrey, Royal Melbourne Inst. of Tech.), "Subband/Transform Coding Using Filter Bank Designs Based on Time Domain Aliasing Cancellation" (ICASSP 1987).

In the spectrum transform using the above-described DFT or DCT, when the spectrum transform is performed in a time block consisting of M samples, M items of independent real-number data are obtained. Generally, in order to reduce distortion at the connections between time blocks, one block overlaps with each of the adjacent blocks by N/2 samples, and thus, a total of N samples are overlapped with the two adjacent blocks. On average, in DFT or DCT, M items of real-number data are quantized and coded for (M+N) samples.

In contrast, in the spectrum transform using the above-described MDCT, when the spectrum transform is performed in a time block consisting of M samples, M items of real-number data is obtained. One block overlaps with each of the adjacent blocks by M/2 samples, and thus, a total of M samples are overlapped with the two adjacent blocks. Accordingly, in MDCT, M items of real-number data are obtained from 2M samples. On average, in MDCT, M items of real-number data are quantized and coded for M samples.

In a decoding apparatus, coded data obtained by performing MDCT is inverse-transformed in each block, and the resulting waveform components are added together while interfering with each other so as to reconstruct a waveform signal.

Generally, the spectrum frequency resolution is enhanced as the time block for spectrum transform becomes longer, thereby allowing energy to be concentrated in specific spectral components. As described above, in MDCT, the spectrum transform is performed with an increased block length by overlapping samples between adjacent blocks, and the number of spectral signal components remains the same as the original number of samples. By using such MDCT, coding can be performed with higher efficiency than by using DFT or DCT. Also, by allowing a sufficiently long overlapping portion between adjacent blocks, inter-block distortion of the waveform signal can be reduced.

By quantizing signal components divided into sub bands by using a filter or spectrum transform, bands in which quantizing noise is generated can be controlled, and high-efficiency coding can be performed by utilizing the masking effect. Before performing quantizing, if signal components in each band are normalized by the maximum of the absolute values of the signal components in the corresponding band, higher efficiency coding can be performed.

When quantizing signal components divided into frequency bands, the bandwidths may be determined by considering, for example, human acoustic characteristics. That is, generally, an audio signal may be divided into a plurality of bands (for example, 25 bands) so that the bandwidth of the higher bands, which are referred to as the "critical bands", becomes greater.

When the bandwidths are determined so that the bandwidth of critical bands becomes greater, data in each band is coded according to a predetermined bit distribution or an adaptive bit allocation.

It is now assumed, for example, that coefficient data obtained by the above-described MDCT processing is coded by an adaptive bit allocation. In this case, the number of bits are adaptively allocated to MDCT coefficient data in each band, and the MDCT coefficient data is then coded. The following two bit allocation techniques are known.

One technique is disclosed in R. Zelinski and P. Noll, "Adaptive Transform Coding of Speech Signals" (IEEE Transactions of Acoustics, Speech, and Signal Processing, Vol. ASSP-25, No. 4, August 1977). In this technique, bit allocation is performed according to the magnitude of the signal in each band, and thus, the quantizing noise spectrum becomes flat to minimize the noise energy. However, since the masking effect is not employed, the actual sound is not acoustically optimal for reducing noise.

The other technique is disclosed in M. A. Kransner (Massachusetts Institute of Technology), "The Critical Band Coder—Digital Encoding of the Perceptual Requirements of the Auditory System" (ICASSP 1980). In this method, by utilizing the masking effect, fixed bit allocation is performed for determining a signal-to-noise (S/N) ratio required for each band. However, due to the fixed bit allocation, even when the characteristic of a sinusoidal wave input is measured, a precise value cannot be obtained.

In order to overcome the above drawbacks, the following high-efficiency coding apparatus has been proposed. All the bits available to bit allocation are divided into bits for fixed bit allocation and bits for adaptive bit allocation. The division ratio of the two types of bit allocations is determined by an input signal, and the division ratio of the fixed bit allocation becomes higher as the signal spectrum becomes smoother.

According to the above-described coding apparatus, many bits can be allocated to blocks containing specific spectral components, such as sinusoidal waves, in which energy is concentrated, thereby making it possible to considerably improve the overall S/N ratio characteristics. Generally, the human acoustic characteristics are extremely sensitive to signals having sharp spectral components. Accordingly, an improved S/N ratio by using this method is effective not only in enhancing precise measurements, but also in improving the sound quality.

Many other bit allocation techniques have been proposed. Because of increasingly precise acoustic models and higher performance of coding apparatuses, even higher efficiency coding is possible not only in terms of measured values, but also for human acoustic characteristics. In these methods, the bit-allocation real-number reference value is determined so that the calculated S/N ratio can be achieved as faithfully as possible, and the integer approximating the reference value is used as the number of allocation bits.

In Japanese Patent Application No. 5-152865 or WO94/28633 filed by the present inventors, another coding method has been proposed in which tone components that are particularly important in an acoustic sense, i.e., signal components in which energy is concentrated, are extracted from a spectrum signal, and are separately coded from the other spectral components. According to this coding method, audio signals can be efficiently coded with a high compression ratio with very little degradation.

In forming code strings, quantizing-precision information and normalizing-coefficient information are first coded with a predetermined number of bits in each band, and the resulting normalized and quantized spectrum signal is coded. A high-efficiency coding method in which the number of bits representing the quantizing precision differs according to the band is described in ISO/IEC 11172-3: 1993(E), 1933. In this standard, the number of bits indicating the quantizing-precision information becomes smaller as the band becomes higher.

Instead of directly coding quantizing precision information, the quantizing-precision information may be determined from the normalizing-coefficient information in a decoding apparatus. According to this method, however, the relationship between the normalizing-coefficient information and the quantizing-precision information is determined when the standard is set, which makes it impossible to introduce the quantizing precision based on more precise acoustic models in the future. Additionally, if the compression ratio has a range, the relationship between the normalizing-coefficient information and the quantizing-precision information has to be determined according to each range.

Another known coding method is disclosed in D. A. Huffman, "A Method for Construction of Minimum Redundancy Codes" (Proc. I.R.E., 40, p. 1098, 1952). In this method, a quantized spectrum signal is coded more efficiently by using variable codes.

The signal coded as described above can be encrypted and distributed, as in PCM signals, in which case, those who have not obtained the corresponding key are unable to play back the original signal. Alternatively, instead of encrypting a coded bit string, a PCM signal may be transformed into a random signal, which is then coded for compression. It is also impossible for users who have not obtained the corresponding key to play back the original signal, and only noise is heard.

Distribution of sample data (trial data) of content data promotes sales of the content data. The sample data includes data to be played back with lower quality than the original data and data for playing back part of the original data (for example, only refrains of an original piece of music). A user plays back the sample data, and if the user likes it, the user purchases a key for decrypting the encrypted data to play back the original content data. Alternatively, the user purchases original content data or a recording medium in which the original content data is recorded.

In the above-described content protection methods, however, the entire data cannot be played back, or only noise is heard. Accordingly, these methods cannot be used for, for example, distributing recording media storing audio data recorded with a relatively low audio quality as sample data. Even if data scrambled by one of the above-described methods is distributed to a user, the user is unable to understand the content of the data.

When encrypting signals subjected to high-efficiency coding, it is very difficult to maintain the compression efficiency while providing code strings that are meaningful for regular playback means. That is, when a code string generated by performing high-efficiency coding is scrambled and is then played back, as described above, only noise is heard, and also, playback means may not operate at all if the scrambled code string is not compatible with the original high-efficiency code standard.

Also, when a scrambled PCM signal is coded with high efficiency and the amount of information is reduced by utilizing the acoustic characteristics, coding becomes irreversible. Accordingly, the scrambled PCM signal cannot be correctly reconstructed when the coded signal is decoded. Thus, it is very difficult to descramble the signal.

Therefore, a method for precisely descrambling the signal must be employed by sacrificing the compression efficiency.

Japanese Unexamined Patent Application Publication No. 10-135944 (corresponding to U.S. Pat. No. 6,081,784) filed by the present inventors discloses the following audio coding method. In this method, among spectral signal components coded from a music signal, signal components only in higher bands are encrypted and are distributed as sample data, thereby enabling users to play back unencrypted signal components in a narrow band without a corresponding key. In this method, signal components only in higher bands are encrypted, and also, high-band bit allocation information is replaced by dummy data, true bit allocation information being recorded at a position ignored by playback decoders.

According to this method, a user receives the distributed sample data, plays it back, and then purchases a key for decrypting the sample data that the user likes into the original data. The user is then able to play back a desired piece of music correctly in all the bands and enjoy the music with high sound quality.

Some content providers desire to restrict the use of sample data obtained by one of the above-described known methods for the purpose of undertaking temporary sales promotion before starting to sell the content. The users who have obtained the sample data based on the above-described known methods are, however, disadvantageously able to utilize the sample data without limitations.

In order to overcome this drawback, a method for controlling a playback operation of sample data disclosed in Japanese Unexamined Patent Application Publication No. 2001-282258 has been proposed. This method enables copyright holders to restrict the use of sample data based on conditions, such as the date, period, the number of uses, and the time for the user is allowed to preview or listen to the sample data.

If the playback operation of sample data is restricted by various conditions as described above, a user must know the status of the sample data, for example, whether the sample data can be played back or until when the sample data can be played back. For example, if content is music data and the use of such data is restricted by the period, sample data that has expired the period cannot be played back. In this case, the user must find the reason why the music data cannot be played back through a display device provided for a playback apparatus.

However, the user is not able to recognize that the sample data has expired unless the user checks with the display device, or the user may consider that the playback device has broken down.

SUMMARY OF THE INVENTION

Accordingly, in view of the above-described background, it is an object of the present invention to distribute, together with usage license information and audio guide data, sample data in which part of original data is replaced by dummy data and small-volume additional data containing true values of the dummy data, and to change a data zone to be played back based on the usage license information when the sample data and the additional data are utilized, so that the audio guide data based on the status of the usage of the content can be played back.

In order to achieve the above-described object, according to one aspect of the present invention, there is provided a data transform method including: a replacement step of replacing first data contained in a first data string by second data; a first generation step of generating a second data string by using data generated in the replacement step; and a usage-license-information addition step of adding, to the second data string, first usage license information including information indicating at least one condition for permitting the use of at least part of the second data string and information indicating the second data string which is permitted to be used based on at least one condition. When the second data string is used, the second data string which is permitted to be used is utilized based on the first usage license information.

According to another aspect of the present invention, there is provided a data transform apparatus including: a replacement unit for replacing first data contained in a first data string by second data; a generator for generating a second data string by using data generated by the replacement unit; and a usage-license-information adder for adding, to the second data string, usage license information including information indicating at least one condition for permitting the use of at least part of the second data string and information indicating the second data string which is permitted to be used based on at least one condition. When the second data string is used, the second data string which is permitted to be used is utilized based on the usage license information.

According to still another aspect of the present invention, there is provided a computer-executable program for controlling a data transform apparatus that transforms a first data string into a second data string. The computer-executable program includes: a replacement step of replacing first data contained in the first data string by second data; a generation step of generating the second data string by using data generated in the replacement step; and a usage-license-information addition step of adding, to the second data string, usage license information including information indicating at least one condition for permitting the use of at least part of the second data string and information indicating the second data string which is permitted to be used based on at least one condition. When the second data string is used, the second data string which is permitted to be used is utilized based on the usage license information.

According to the present invention, data strings can be transformed. Before distributing sample data in which part of original data is replaced by dummy data and small-amount additional data containing the true value of the dummy data, usage license information and audio guide data are added. By specifying coded frames (including audio data) that can be played back based on various conditions, audio guide data can be switched and played back according to the usage status of content.

According to a further aspect of the present invention, there is provided a data processing method including: a usage-license-information management step of managing usage license information including information indicating at least one condition for permitting at least part of a sixth data string to be played back or recorded and information indicating the sixth data string which is permitted to be played back or recorded based on at least one condition; and a data processing step of playing back or recording the sixth data string which is permitted to be played back or recorded based on the usage license information.

According to a yet further aspect of the present invention, there is provided a data processing apparatus including: a usage-license-information manager for managing usage license information including information indicating at least one condition for permitting at least part of a predetermined data string to be played back or recorded and information indicating the predetermined data string which is permitted to be played back or recorded based on at least one condition; and a data processor for playing back or recording the predetermined data string which is permitted to be played back or recorded based on the usage license information.

According to a further aspect of the present invention, there is provided a computer-executable program for controlling a data processing apparatus that plays back or records a predetermined data string. The computer-executable program includes: a usage-license-information management step of managing usage license information including information indicating at least one condition for permitting at least part of a predetermined data string to be played back or recorded and information indicating the predetermined data string which is permitted to be played back or recorded based on at least one condition; and a data processing step of playing back or recording the predetermined data string which is permitted to be played back or recorded based on the usage license information.

With this configuration, data strings can be played back or recorded by referring to usage license information, and also, data can be reconstructed by using different data strings.

BRIEF DESCRIPTION OF THE DRAWINGS

FIG. 14 illustrates the structures of sample data, additional data, and high-quality data;

DESCRIPTION OF THE PREFERRED EMBODIMENTS

The present invention is described in detail below with reference to the accompanying drawings through illustration of an embodiment.

Figure 1:
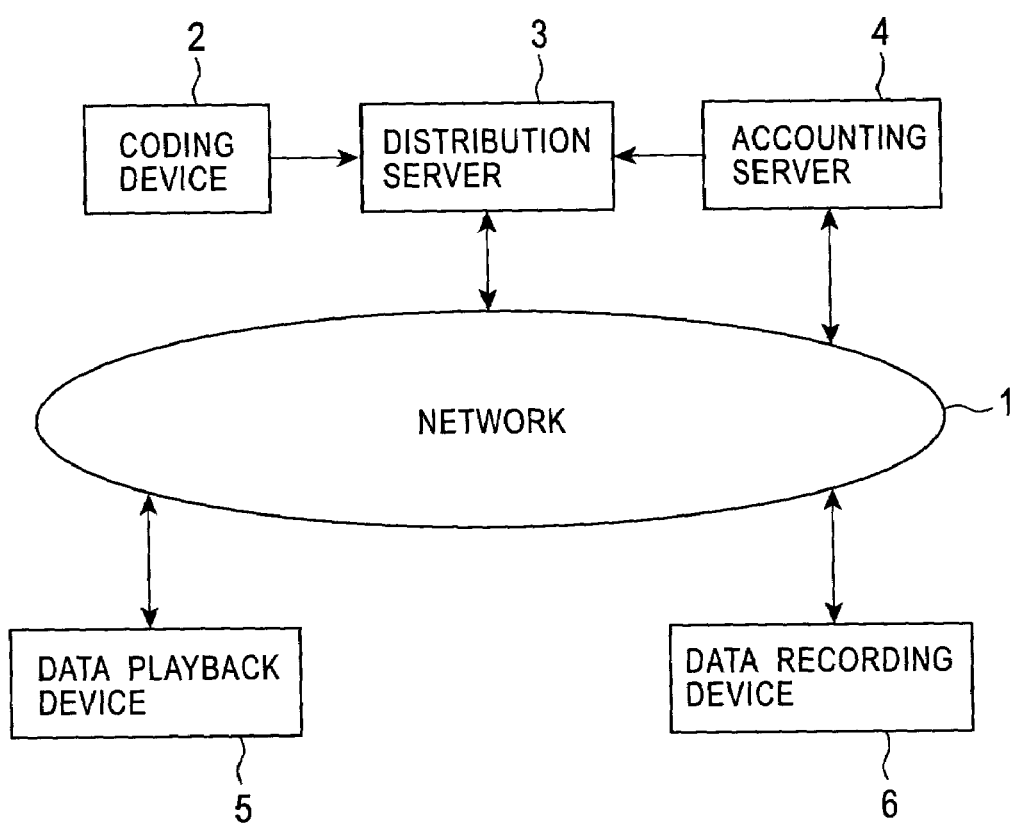
FIG. 1 is a block diagram illustrating the configuration of a data distribution system to which the present invention is applied.

FIG. 1 is a block diagram illustrating the configuration of a data distribution system according to the present invention.

A coding device 2 generates, from original content data, low-quality sample data and additional data that contains data required for reconstructing the original data from the sample data, encrypts these data if necessary, and supplies them to a distribution server 3.

The distribution server 3 distributes the sample data supplied from the coding device 2 to a data playback device 5 or a data recording device 6, which are utilized by a plurality of users, as pay data or free data via a network 1, which is wired or wireless means, for example, the Internet. Although only one data playback device 5 and one data recording device 6 are shown in FIG. 1, a plurality of data playback devices 5 and data recording devices 6 may be connected to the network 1.

A user plays back the sample data by using the data playback device 5 to preview or listen to it, or records the sample data in a predetermined recording medium by using the data recording device 6, and then plays it back. If the user likes the content and desires to purchase it, the user obtains additional data corresponding to the sample data from the distribution server 3 and decrypts data, if it is encrypted, so as to reconstruct the original data. The sample data can be provided free of charge or for an amount of money smaller than that required for purchasing the additional data. If the sample data is charged for, required accounting processing is performed in an accounting server 4.

If the user desires to purchase pay sample data or additional data, the user accesses the accounting server 4 to conduct payment settlement before receiving the data. Accordingly, the distribution server 3 distributes data requested by the user after receiving a message from the accounting server 4 that payment settlement has been completed.

Figure 2:
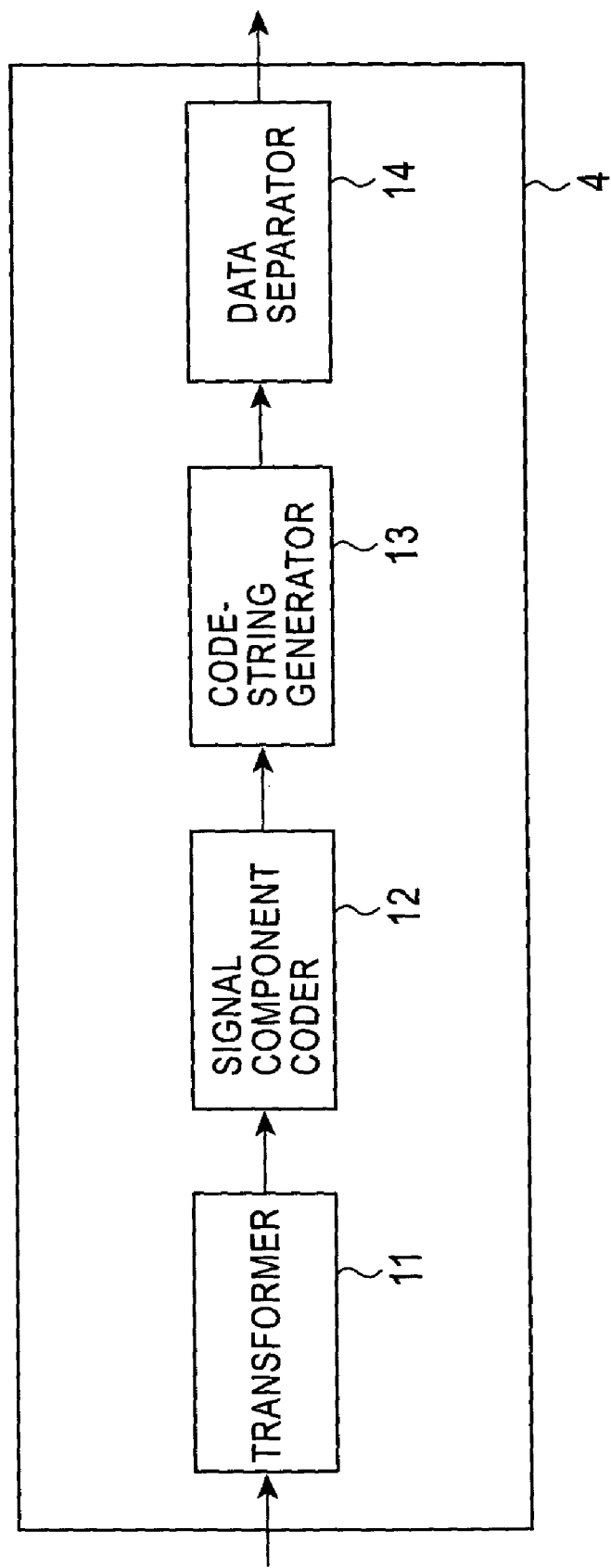
FIG. 2 is a block diagram illustrating the configuration of a coding device to which the present invention is applied.

FIG. 2 is a block diagram illustrating the configuration of the coding device 2 for generating sample data in response to the input of an acoustic waveform signal.

It is now assumed that, in response to the input of a digital signal, such as an audio PCM signal, the coding device 2 performs high-efficiency coding by conducting sub-band coding (SBC), adaptive transform coding (ATC), or adaptive bit allocation. ATC is a coding method in which bit allocation is adaptively performed based on, for example, DCT. More specifically, an input signal is transformed into spectrum signal components in units of time blocks, and the spectrum signal components in each band are normalized together. That is, each spectrum signal component is divided by a normalizing coefficient for approximating the maximum signal component. Then, the resulting signal components are quantized with a quantizing precision which is suitably determined by the characteristics of the signal components, and the quantized signal components are then coded.

In FIG. 2, upon receiving an acoustic waveform signal, a transformer 11 transforms the acoustic waveform signal into signal frequency components and outputs them to a signal component coder 12. The signal component coder 12 codes the received signal frequency components, and outputs them to a code-string generator 13. The code-string generator 13 generates a code string from the coded signal frequency components, and outputs it to a data separator 14. The data separator 14 performs predetermined processing, for example, changing normalizing-coefficient information or inserting sample-data time information, on the code string input from the code-string generator 13 so as to transform content data (original data) that can be played back with high quality into sample data. The data separator 14 also generates additional data (reconstruction data) associated with the sample data, which is sold to a user who desires to reconstruct or play back the original data. Then, the data separator 14 outputs the sample data and the additional data.

Figure 3:
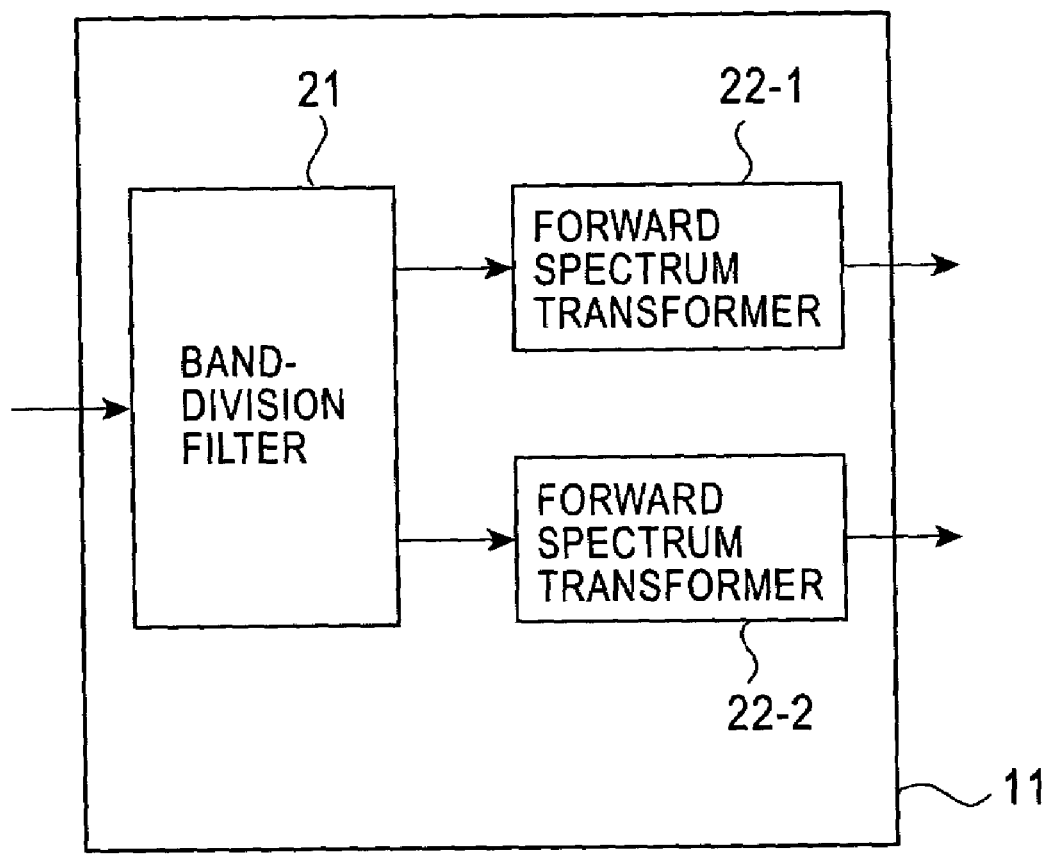
FIG. 3 is a block diagram illustrating the configuration of a transformer shown in FIG. 2.

FIG. 3 is a block diagram illustrating the detailed configuration of the transformer 11.

An acoustic waveform signal input into the transformer 11 is divided into signal components in two bands by a band-division filter 21, and the signal components are output to forward spectrum transformers 22-1 and 22-2. The forward spectrum transformers 22-1 and 22-2 transform the signal components into spectrum signal components by using, for example, MDCT, and outputs them to the signal component coder 12. The bandwidth of the signal components input into the forward spectrum transformers 22-1 and 22-2 is one half the bandwidth of the signal input into the band-division filter 21. The signal input into the band-division filter is also reduced to one half.

In the transformer 11 shown in FIG. 3, the signal components divided into two bands by the band-division filter 21 are transformed into spectrum signal components by using MDCT. Another method may be employed for transforming an input signal into spectrum signal components. For example, an input signal may be transformed into spectrum signal components by using MDT without being divided into bands. Alternatively, the forward spectrum transformers 22-1 and 22-2 may transform the input signal into spectrum signal components by using DCT or DFT.

Although an input signal can be divided into band signal components by using a band-division filter, it is preferably transformed into spectrum signal components by using MDCT, DCT, or DFT, which allows many frequency components to be computed with a relatively small amount of computation.

Although in FIG. 3 the input acoustic waveform signal is divided into two bands in the band-division filter 21, it may be divided into three or more bands. Information concerning the number of bands divided in the band-division filter 21 is output to the code-string generator 13 via the signal component coder 12.

Figure 4:
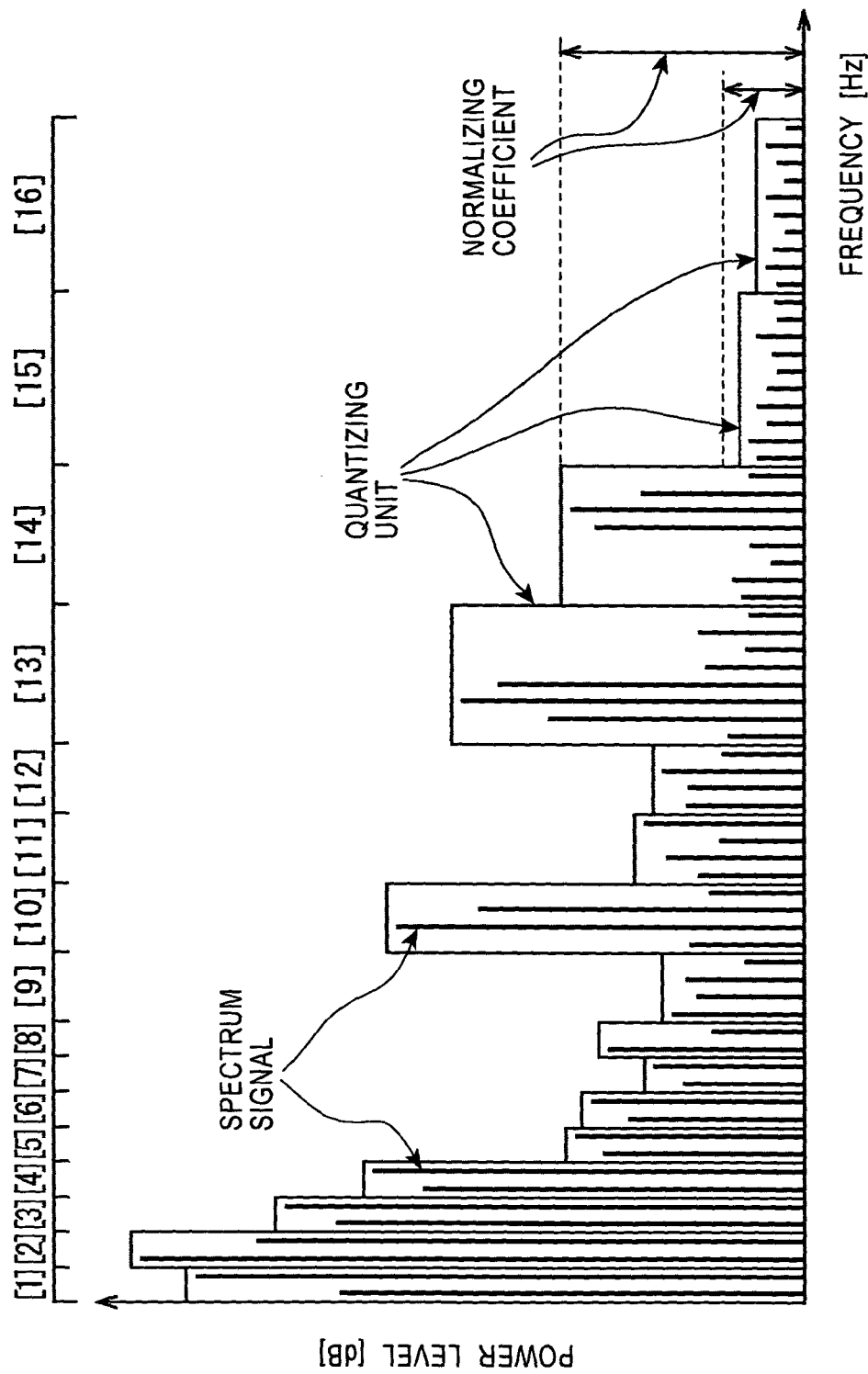
FIG. 4 illustrates a spectrum signal and a quantizing unit.

FIG. 4 illustrates a spectrum signal obtained by transforming the absolute values of the spectrum signal components subjected to MDCT processing by the transformer 11 into power levels.

The acoustic waveform signal input into the transformer 11 is transformed into, for example, 64 spectrum signal components in units of predetermined time blocks. These spectrum signal components are divided into 16 bands, such as [1] through [16] indicated by solid rectangles in FIG. 4, according to processing, which are described below, by the signal component coder 12, and the spectrum signal components in each band are then quantized and normalized. A set of spectrum signal components divided into 16 bands, that is, a set of spectrum signal components to be subjected to quantization and normalization together, is a quantizing unit.

By changing the quantizing precision in each quantizing unit based on the distribution of frequency components, high-efficiency coding can be performed with very little degradation of the audio quality perceptible to human ears. Thus, when coding acoustic waveform signals, coding parameters, such as quantizing precision, can be controlled to improve the coding efficiency by utilizing human acoustic characteristics.

Figure 5:
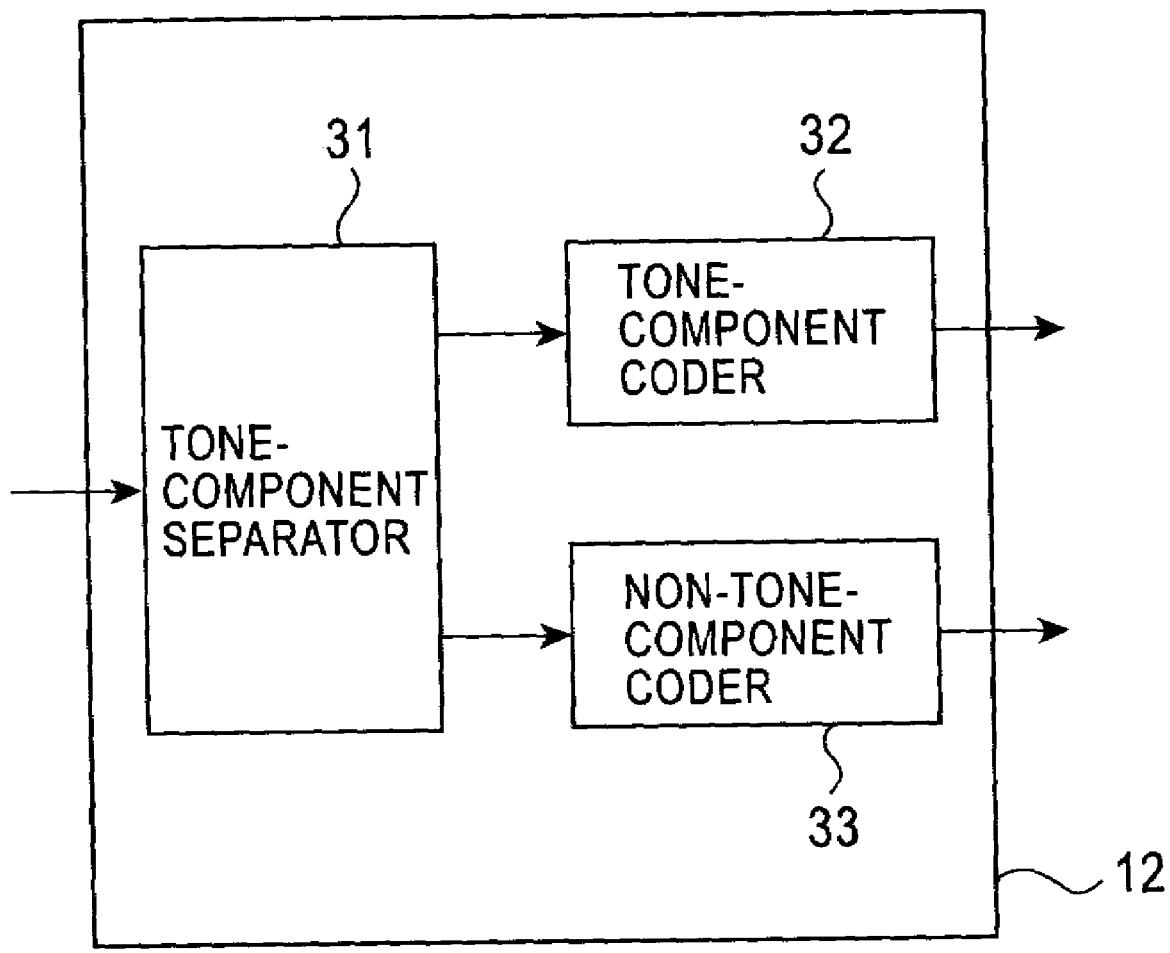
FIG. 5 is a block diagram illustrating the configuration of a signal component coder shown in FIG. 2.

FIG. 5 is a block diagram illustrating the detailed configuration of the signal component coder 12. In the signal component coder 12 shown in FIG. 5, tone components that are particularly important in an acoustic sense, i.e., signal components having energy concentrated in specific frequencies, are extracted from the input spectrum signal, and are separately coded from the other spectrum components.

A spectrum signal received from the transformer 11 is separated into tone components and non-tone components by a tone-component separator 31. The tone components are output to a tone-component coder 32, and the non-tone components are output to a non-tone-component coder 33.

Figure 6:
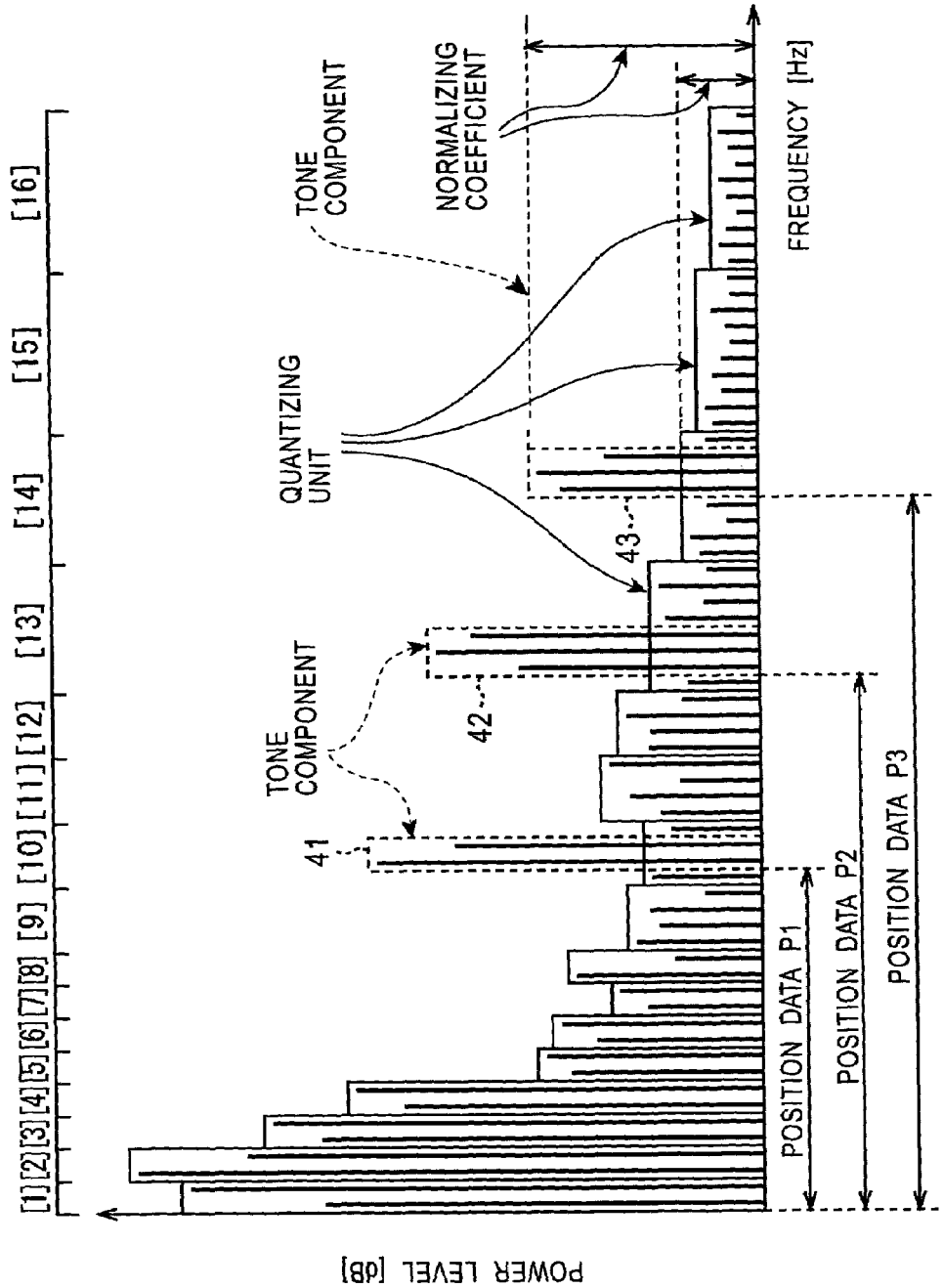
FIG. 6 illustrates tone components and non-tone components.

Tone components and non-tone components are described in detail below with reference to FIG. 6. It is now assumed that the spectrum signal input into the tone-component separator 31 is the signal shown in FIG. 6. In this case, signal components having high power levels are separated from non-tone components as tone components 41 through 43. Position data P1 through P3 indicating the positions of the separated tone components 41 through 43 and the bandwidths of the tone components 41 through 43 are detected and output to the tone-component coder 32 together with the tone components 41 through 43.

Tone components may be separated by using, for example, the method disclosed in Japanese Patent Application No. 5-152865, WO94/28633, or U.S. Pat. No. 5,717,821 filed by the present inventors. The tone components and the non-tone components separated by this method are quantized with different numbers of bits by the processing of the tone-component coder 32 and the non-tone-component coder 33, respectively, which are described below.

The tone-component coder 32 and the non-tone-component coder 33 code the received signal components. The tone-component coder 32 quantizes the tone components with a greater number of bits, i.e., with an increased level of quantizing precision, while the non-tone-component coder 33 quantizes the non-tone components with a smaller number of bits, i.e., with a decreased level of quantizing precision.

Although it is necessary to add information concerning, for example, the positions and the bandwidths of the extracted tone components, to the tone components, non-tone components can be quantized with a smaller number of bits. In particular, if an acoustic waveform signal input into the coding device 2 is a signal having energy concentrated in specific frequencies, it can be coded effectively with a high compression ratio with very little degradation in an acoustic sense.

Figure 7:
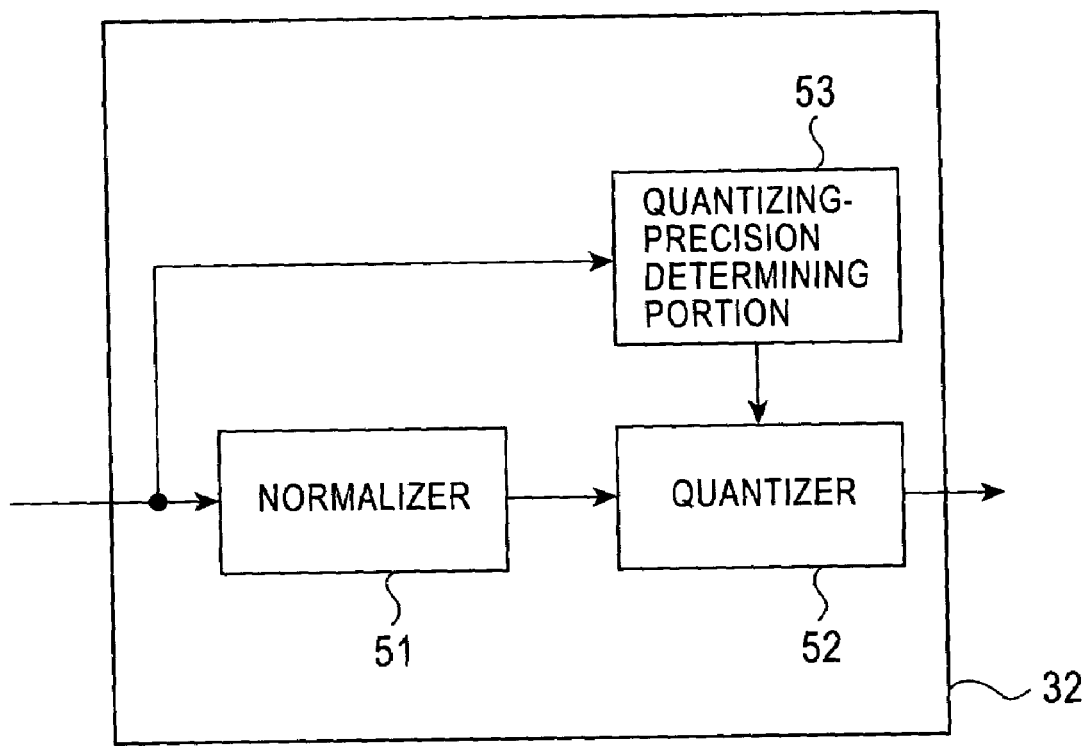
FIG. 7 is a block diagram illustrating the configuration of a tone-component coder shown in FIG. 5.

FIG. 7 is a block diagram illustrating the detailed configuration of the tone-component coder 32.

A normalizer 51 receives tone components in each quantizing unit, normalizes them, and outputs the normalized components to a quantizer 52. A quantizing-precision determining portion 53 calculates the quantizing precision by referring to the quantizing unit of an input spectrum signal, and outputs the calculation result to the quantizer 52. Since the quantizing unit is formed of tone components, the quantizing-precision determining portion 53 performs calculations to increase the quantizing precision. The quantizer 52 quantizes the normalized result input from the normalizer 51 with the quantizing precision determined by the quantizing-precision determining portion 53 so as to generate codes. The quantizer 52 also outputs coding information, such as normalizing-coefficient information and quantizing-precision information, together with the generated codes.

The tone-component coder 32 also codes position information concerning the positions of the tone components, which is input together with the tone components, and outputs the coded information.

Figure 8:
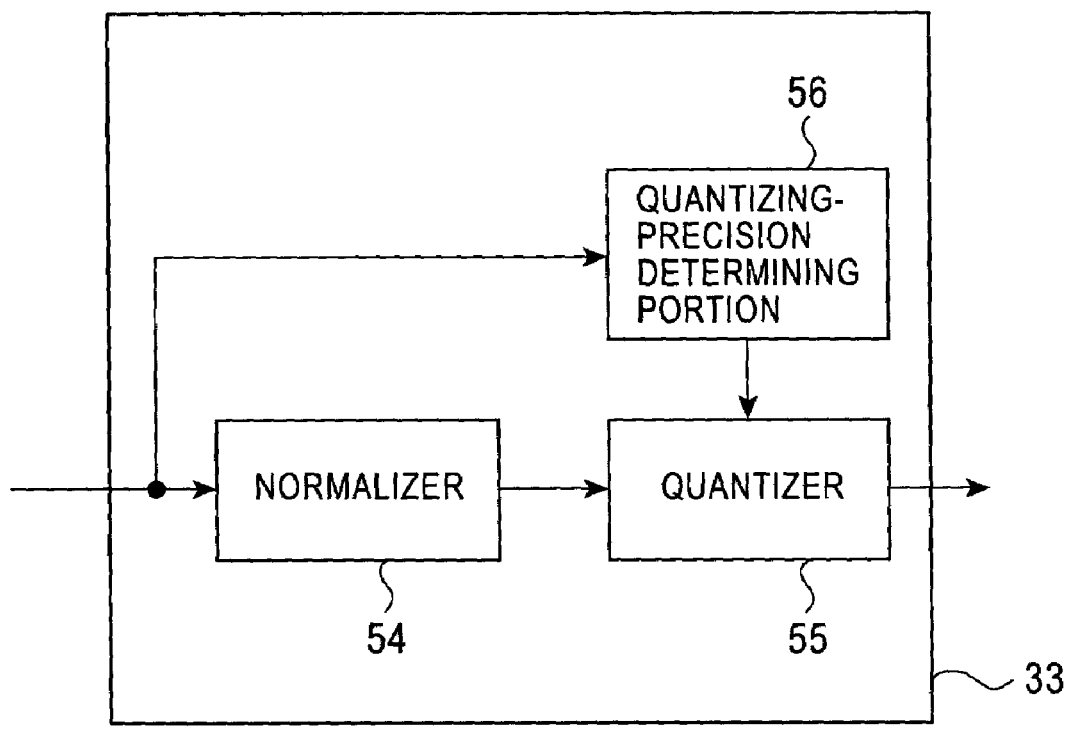
FIG. 8 is a block diagram illustrating the configuration of a non-tone-component coder shown in FIG. 5.

FIG. 8 is a block diagram illustrating the detailed configuration of the non-tone-component coder 33.

A normalizer 54 receives non-tone components in each quantizing unit, normalizes them, and outputs the normalized components to a quantizer 55. A quantizing-precision determining portion 56 calculates the quantizing precision by referring to the quantizing unit of an input spectrum signal, and outputs the calculated result to the quantizer 55. Since the input quantizing unit is formed of non-tone components, the quantizing-precision determining portion 56 performs calculations to decrease the quantizing precision. The quantizer 55 quantizes the normalized result input from the normalizer 54 with the quantizing precision determined by the quantizing-precision determining portion 56 so as to generate codes. The quantizer 55 also outputs coding information, such as normalizing-coefficient information and quantizing-precision information, together with the generated codes.

The coding efficiency achieved by the above-described coding method can be further improved. For example, variable-length coding is used, and among quantized spectral components, a relatively short code length can be assigned to signal components which appear with higher frequency, and a relatively long code length can be assigned to signal components which appear with lower frequency so as to decrease the entropy of the codes, thereby enhancing the coding efficiency.

Then, the code-string generator 13 shown in FIG. 2 generates a code string consisting of a plurality of frames that can be recorded in a recording medium or transmitted to another information processing apparatus via a data transmission channel from the codes of the signal frequency components output from the signal component coder 12, and outputs the code string to the data separator 14. The code string generated by the code-string generator 13 is audio data that can be played back with high quality by regular decoders.

Figure 9:
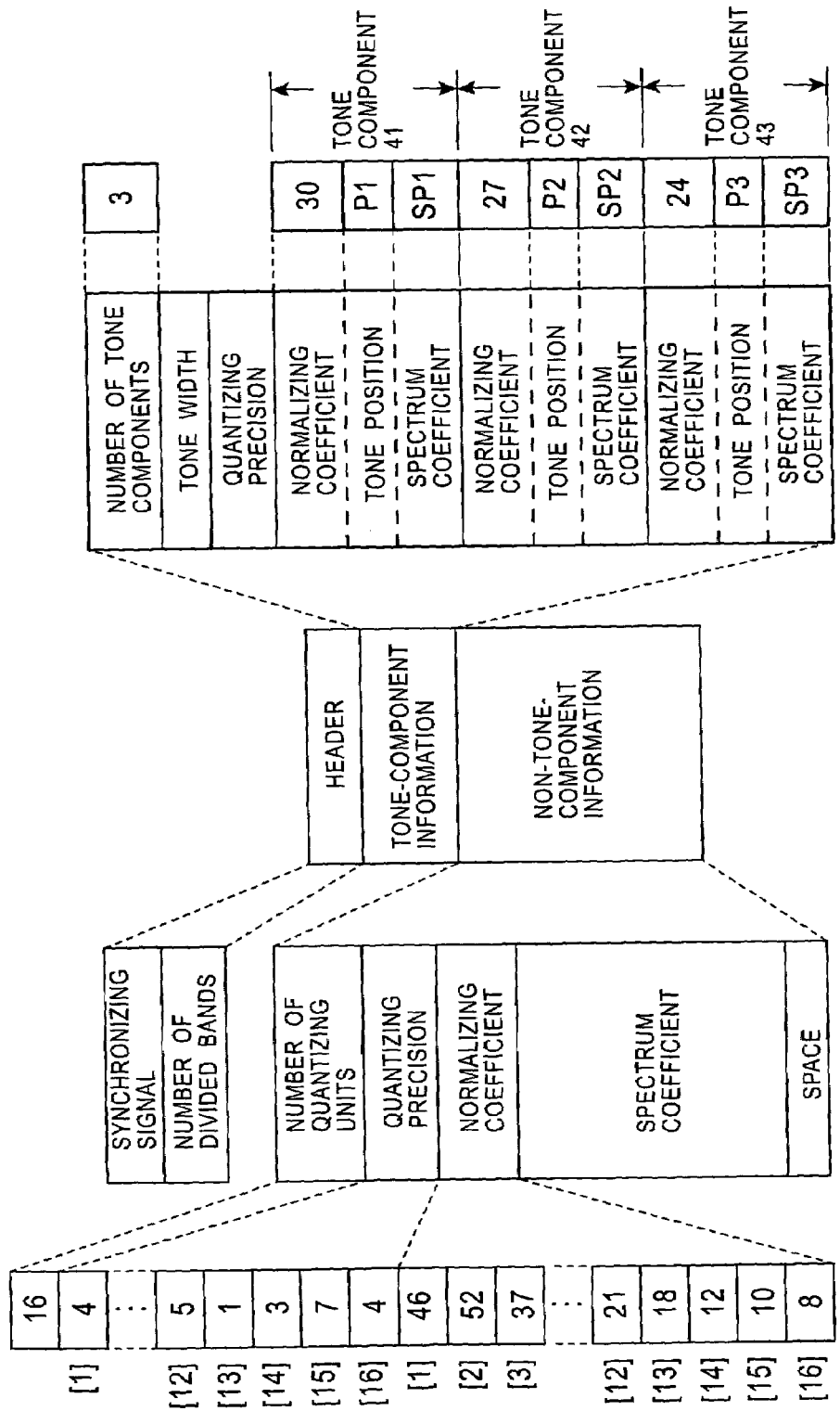
FIG. 9 illustrates the format of a frame of original data.

FIG. 9 illustrates an example of the frame format of audio data that is generated by the code-string generator 13 and that can be played back with high quality.

At the head of each frame, a fixed-length header containing a synchronizing signal is disposed. The header also contains the number of bands divided in the band-division filter 21 of the transformer 11 described with reference to FIG. 3.

In each frame, after the header, tone-component information concerning separated tone components is recorded. The tone-component information includes the number of tone components (3 in this example), the tone width, and information concerning the quantizing precision used for quantizing the tone components by the tone-component coder 32 shown in FIG. 7. Subsequently, the tone-component information includes data of the tone components 41 through 43, such as the normalizing coefficients, the tone positions, and the spectrum coefficients. In this example, for the tone component 41, the normalizing coefficient is 30, the tone position is P1, and the spectrum coefficient is SP1; for the tone component 42, the normalizing coefficient is 27, the tone position is P2, and the spectrum coefficient is SP2; and for the tone component 43, the normalizing coefficient is 24, the tone position is P3, and the spectrum coefficient is SP3.

Subsequent to the tone-component information, non-tone-component information is recorded. The non-tone-component information includes the number of quantizing units (16 in this example), and the quantizing-precision information, the normalizing-coefficient information, and the spectrum-coefficient information of each of the 16 quantizing units when the non-tone components are coded by the non-tone-component coder 33 shown in FIG. 8. As the quantizing-precision information, the value of 4 is assigned to the quantizing unit [1] in the lowest band, and the value of 4 is assigned to the quantizing unit [16] in the highest band. As the normalizing-coefficient information, the value of 46 is assigned to the quantizing unit [1] in the lowest band, and the value of 8 is assigned to the quantizing unit [16] in the highest band. As the normalizing-coefficient information, values proportional to the dB values of the power levels of the spectrum signal are used. If the length of the content frame is fixed, a space may be created after the spectrum-coefficient information.

Figure 10:
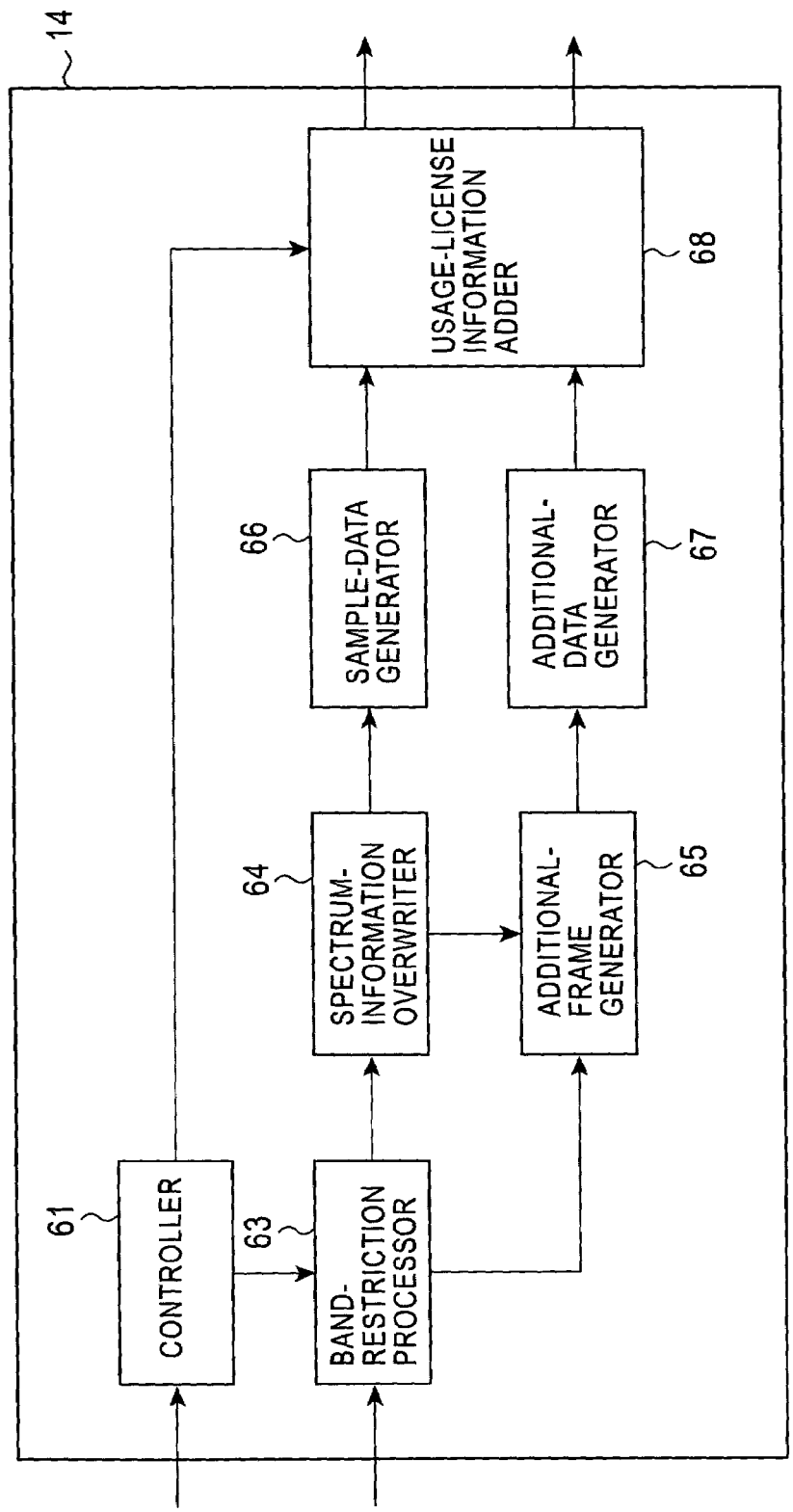
FIG. 10 is a block diagram illustrating the configuration of a data separator shown in FIG. 2.

FIG. 10 is a block diagram illustrating the detailed configuration of the data separator 14 shown in FIG. 2.

A controller 61 obtains setting data, such as a permitted zone of the sample data and usage license information, and audio guide data, which are input from an external operation input unit (not shown), and controls a band-restriction processor 63. The controller 61 also controls a usage-license information adder 68. The setting data, such as the sample zone of the sample data and the usage license information, and the audio guide data may be prestored in a recorder (not shown), and the controller 61 may obtain such data when necessary.

According to the information of the sample zone of the sample data (start position, zone length, band, etc.) input from the controller 61, the band-restriction processor 63 generates, from the coded frames of the input original data, data restricted in the designated band (sample band) based on the designated number of coded frames (sample zone length) from the designated position (start position). For example, among the spectrum data shown in FIG. 6, the normalizing coefficients of some quantizing units in the higher band are minimized so that only lower frequency band can be decoded, thereby decreasing the quality of the content to be played back.

It is now assumed that sample data is generated by setting the sample band to be quantizing units [1] through [12]. In this case, the controller 61 informs the band-restriction processor 63 that the quantizing units contained in the sample band are [1] through [12], and the band-restriction processor 63 minimizes the values of the normalizing coefficient information of the quantizing units [13] through [16], as shown in FIG. 11, and also outputs the true values of the normalizing coefficient information of the quantizing units [13] through [16] to an additional-frame generator 65.

As in the non-tone components, the band-restriction processor 63 minimizes the normalizing coefficients of the portions of the tone components outside the sample band, and outputs the true values to the additional-frame generator 65.

Figure 11:
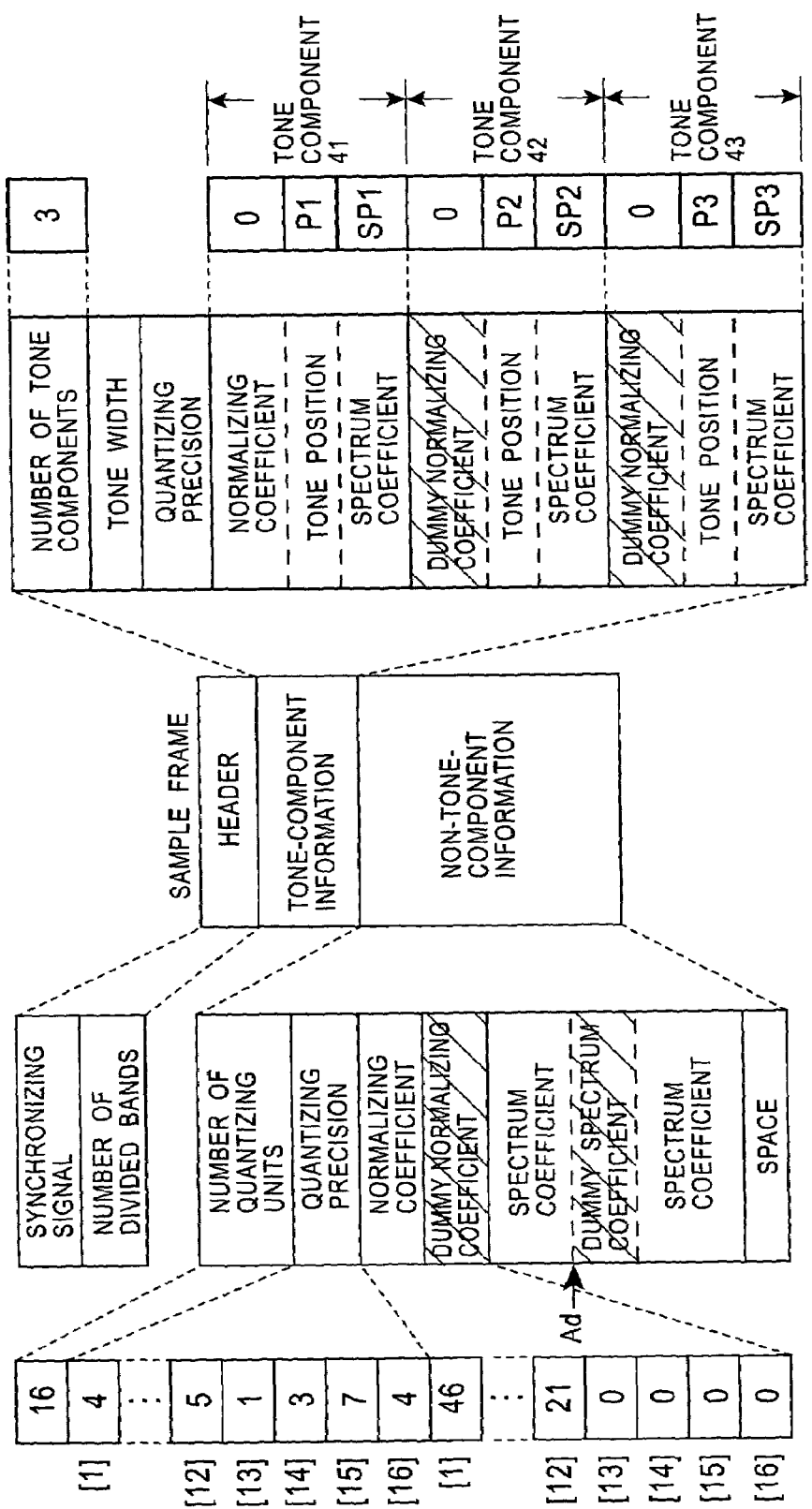
FIG. 11 illustrates the format of a sample frame.
Figure 12:
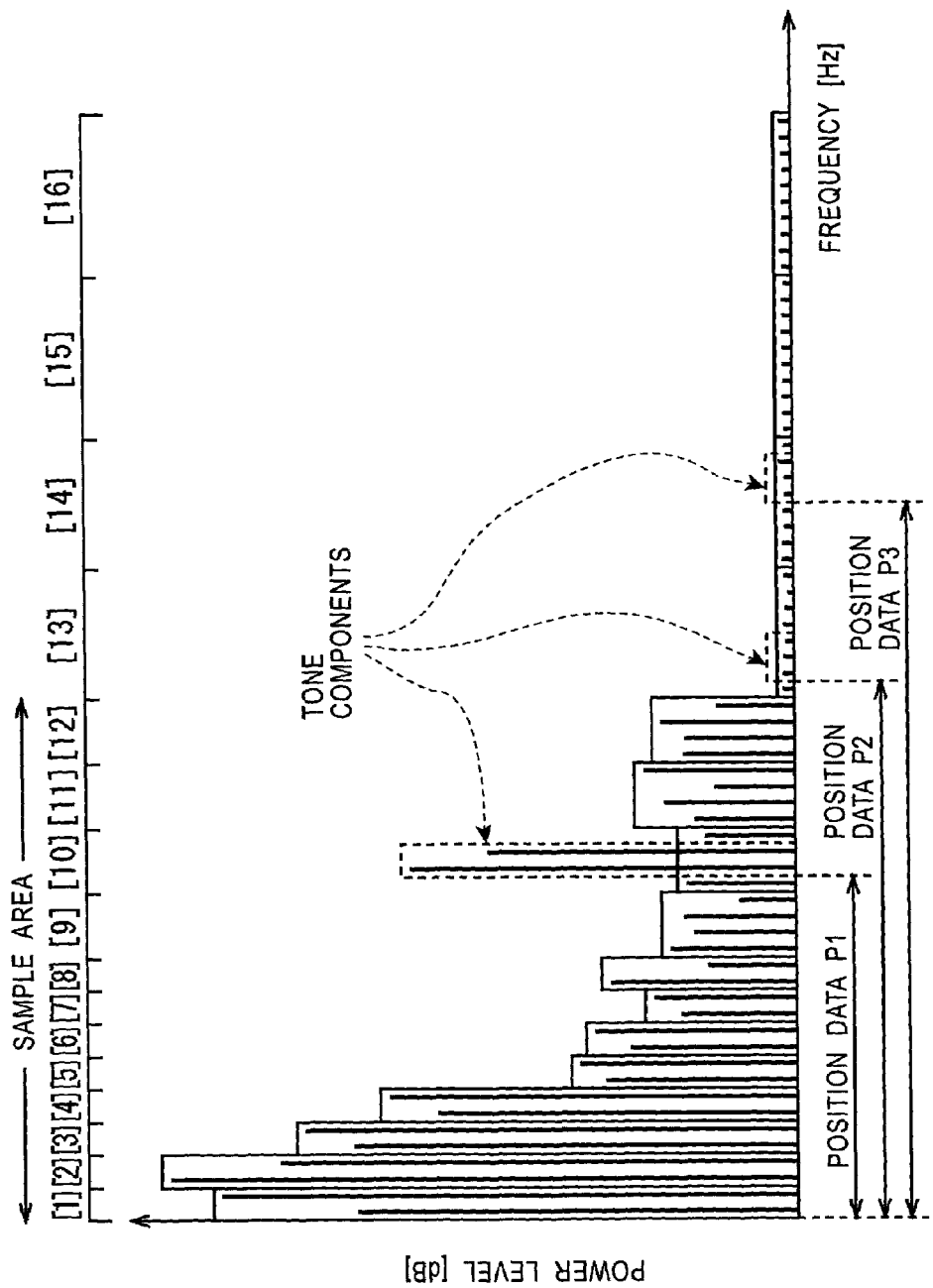
FIG. 12 illustrates a spectrum signal corresponding to the sample frame shown in FIG. 11.

The spectrum signal obtained by playing back the sample data shown in FIG. 11 is shown in FIG. 12. Since the values of the normalizing-coefficient information of the quantizing units [13] through [16] are minimized in the band-restricted coded frames (sample frames), the non-tone spectrum signal components contained in such quantizing units are also minimized. The spectrum signals of the two tone components 42 and 43 contained in the quantizing units [13] through [16] are also minimized. That is, when decoding and playing back the sample data, only the narrow-band spectrum signal components in the quantizing units [1] through [12] are played back.

Although in the example in FIG. 11 the sample band is set to be the quantizing units [1] through [12], the sample band may vary in each frame. Additionally, all the normalizing coefficients of the non-tone components and the tone components may be minimized (i.e., the sample band is zero), in which case, the sample frame can be muted.

The processing for decreasing the quality of an original coded frame to generate a sample frame may be applied to all the coded frames. Alternatively, it may be applied to frames in one part of the content, or to frames in a plurality of parts of the content. When decreasing the quality of frames in more than one part, the frames other than those in the designated parts are muted, thereby preventing the original coded frames from being contained in the sample data.

According to the above-described technique, when the sample data is played back, only the narrow-band spectrum signal is played back with low quality, or no sound is heard. Thus, the sample data is played back with lower quality compared to the original data shown in FIG. 9.

Since the normalizing coefficients of the non-tone components are minimized, spectrum-coefficient information higher than the position indicated by Ad in FIG. 11 is minimized when playing back the sample data. This makes it possible to record certain information in this area.

More specifically, a spectrum-information overwriter 64 writes random dummy data into the spectrum coefficient information higher than the position Ad in FIG. 11, and outputs the dummy data to a sample-data generator 66 as a sample frame. The spectrum-information overwriter 64 outputs true spectrum-coefficient information replaced by the dummy data, and if necessary, information indicating the position of the dummy data, to the additional-frame generator 65.

Dummy data to replace the spectrum-coefficient information may be written in all the frames. Alternatively, it may be written into only some of the frames.

If variable-length coding is performed on the spectrum-coefficient information, and if the variable-length codes are sequentially recorded in the spectrum-coefficient information area from the lower band to the higher band, part of the variable-length codes in the intermediate band is missing, since the spectrum-coefficient information which is minimized when decoding the data is replaced with other information, for example, dummy data. This makes it impossible to decode the higher-band data including the intermediate-band data. That is, it is very difficult to reconstruct or play back the spectrum-coefficient information of the original data outside the sample band contained in the sample data without using the true values of the dummy data indicated in the additional frame. As a result, the security of the sample data can be enhanced.

When part of the normalizing-coefficient information is missing or when part of the spectrum-coefficient information is replaced by other information, it is very difficult to predict the true data compared to when a relatively short encryption key is deciphered. Illegal falsification of the sample data results in a deterioration in the audio quality. Accordingly, it is very difficult for users who are not permitted to play back original data to predict the original data based on the sample data, thereby enhancing the protection of the copyright of the creator or the distributor of the content data.

Even if true values replaced by dummy data in sample data are predicted from the dummy data, there is no danger of expanding such damage to other content, unlike when an encryption algorithm is broken. Thus, a higher level of security can be achieved compared to when content data is encrypted by using a specific algorithm and is distributed as sample data.

Then, the true values of the normalizing-coefficient information of the non-tone components and the tone components changed by the band-restriction processor 63, and the true values of part of the spectrum-coefficient information of the non-tone components overwritten by the spectrum-coefficient information overwriter 64 are supplied to the additional-frame generator 65, which is described below, and are recorded in the additional data.

Instead of changing the normalizing-coefficient information of the quantizing units outside the sample band, the quantizing-precision information of the quantizing units may be minimized. Alternatively, the quantizing-precision information may be minimized together with the normalizing-coefficient information. In this case, the band-restriction processor 63 supplies the true values of the changed quantizing-precision information to the additional-frame generator 65.

However, changing the normalizing-coefficient information is different from changing the quantizing-precision information in terms of the security level, that is, the difficulty in illegally predicting the original data from the sample data without using the additional data. For example, when the original data is generated by using a bit allocation algorithm in which the quantizing-precision information is calculated based on the normalizing-coefficient information, and if, in this case, only the quantizing-precision information outside the sample band is changed without changing the normalizing-coefficient information, the true values of the quantizing-precision information may be predicted based on the normalizing coefficient information.

In contrast, it is difficult to predict the normalizing-coefficient information from the quantizing-precision information. It is thus preferable that the normalizing-coefficient information be changed in view of security. By changing both the normalizing-coefficient information and the quantizing-precision information outside the sample band, the possibility of the original data being illegally predicted becomes extremely low. Alternatively, the normalizing-coefficient information or the quantizing-precision information outside the sample band may be selectively changed in each frame of the sample data.

The additional-frame generator 65 generates each frame (additional frame) forming additional data for increasing the quality of the sample data based on the normalizing-coefficient information and the quantizing-precision information outside the sample band supplied from the band-restriction processor 63 and the spectrum coefficient information outside the sample band supplied from the spectrum-information overwriter 64. After previewing or listening to this sample data, the user purchases this additional data, thereby making it possible to reconstruct or play back the original data from the sample data.

Figure 13:
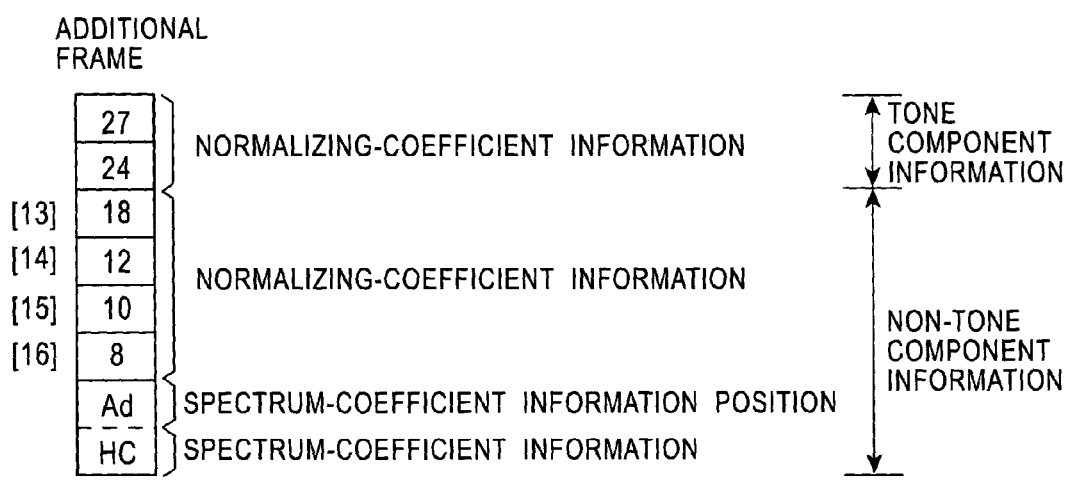
FIG. 13 illustrates an additional frame.

FIG. 13 illustrates the format of an additional frame to be generated. As discussed with reference to FIG. 11, when the quantizing units used in the sample band of the permitted zone are [1] through [12], the normalizing-coefficient information (indicated by the corresponding hatched portion in FIG. 11) of the two tone components contained in the quantizing units [13] through [16] and the four items of normalizing-coefficient information (indicated by the corresponding hatched portion in FIG. 11) of the quantizing units [13] through [16] are replaced by dummy data. Part of the spectrum-coefficient information (indicated by the corresponding hatched portion in FIG. 11) of the non-tone components outside the sample band is also replaced by dummy data.

Upon receiving the true values corresponding to the dummy data of the normalizing-coefficient information of the tone components and the non-tone components changed by the band-restriction processor 63 and also receiving the true values and the position information corresponding to the dummy data of part of the spectrum-coefficient information of the non-tone components outside the sample band and changed by the spectrum-information overwriter 64, the additional-frame generator 65 generates the additional frame shown in FIG. 13.

That is, in the additional frame, information concerning the tone components and information concerning the non-tone components are recorded. In the additional frame shown in FIG. 13, the quantizing units used in the sample band are [1] through [12]. As the information of the tone components, the normalizing-coefficient information (in this example, the values 27 and 24) of the individual tone components replaced by dummy data is recorded. As the information of the non-tone components, the normalizing-coefficient information (in this example, the values 18, 12, 10, and 8) replaced by dummy data and the spectrum-coefficient information (in this example, HC) replaced by dummy data and the position information thereof (in this example, Ad) are recorded.

In the example shown in FIG. 13, the position information of the spectrum-coefficient information replaced by dummy data in the sample frame is indicated in the additional frame. However, the position at which the spectrum-coefficient information is replaced by dummy data can be located at the head of the spectrum-coefficient information outside the sample band, thereby making it possible to determine the position of the spectrum-coefficient information replaced by dummy data from the normalizing-coefficient information of the non-tone components replaced by dummy data. Accordingly, the position information can be omitted from the additional frame. On the other hand, if the position at which the spectrum-coefficient information replaced by dummy data is located after the head of the spectrum-coefficient information outside the sample band, it is necessary to indicate the position information of the spectrum-coefficient information replaced by dummy data in the additional frame, as shown in FIG. 13.

Also by indicating part of the information to be added to additional data in the space of a sample frame, the amount of the additional data can be decreased. Thus, the time required for the user to record additional data in a recording medium by using MMK, or the time required for downloading the additional data, can be decreased.

As described above, the signal component coder 12 of the coding device 2 separates an input signal into tone components and non-tone components, and codes them separately. However, by using the non-tone-component coder 33 shown in FIG. 8 instead of the signal component coder 12, an input signal may be coded without being separated into tone components and non-tone components. The resulting additional frame is without tone component information, as shown in FIG. 13, and in this case, the amount of additional data can be decreased.

The sample-data generator 66 generates the header of sample data, and adds the generated header to the supplied sample frames so as to generate the sample data. The sample-data generator 66 then supplies the sample data to the usage-license information adder 68. The header of the sample data contains information concerning, for example, a content ID for identifying the content, the content playback time, the content title, and the coding method.

An additional-data generator 67 generates the header of additional data, and adds the generated header to the supplied frames so as to generate additional data. The additional-data generator 67 then supplies the additional data to the usage-license information adder 68. The header of the additional data includes information concerning, for example, the content ID for identifying the content to distinguish the additional data from the sample data, the content playback time, and the coding method, if necessary.

By using the setting data of the usage-license information and the audio guide data supplied from the controller 61, the usage-license information adder 68 adds the usage-license information and the audio guide data to both the sample data supplied from the sample-data generator 66 and the additional data supplied from the additional-data generator 67.

The usage-license information includes various conditions, such as the expiry date, the period, the number of times the content can be used, and the time at which the content can be used, etc., thereby making it possible to restrict the use of the content. That is, among coded frames of certain content C, by designating coded frames that can be used when a certain condition A is satisfied, and by designating coded frames that can be used when the condition A is not satisfied, the use of the content C can be restricted. It is thus possible to set the usage-license information of the content C so that, for example, all the coded frames can be played back when the condition "before the usage expiry date" is satisfied, and none of the frames can be played back when the condition "before the usage expiry date" is not satisfied.

It is also possible to set a plurality of conditions in the usage-license information. For example, when the condition is set to be "less than the number of usage times and before the usage expiry date", the content cannot be used if the maximum number of usage times has been exceeded or if the usage expiry date has passed. Similarly, when the condition is set to be "less than the number of usage times or before the usage expiry date", the content cannot be used if the maximum number of usage times has bee exceeded and if the usage expiry date has passed.

More detailed conditions can be set in the usage-license information. For example, conditions can be set to be "only one more usage" or "within three days before the usage expiry date" for allowing the content to be used.

The audio guide data can be used under various conditions set in the usage-license information. Audio guidance, for example, "the remaining number of usage times is zero" or "the usage expiry date has passed", is informed to the user by sound.

The usage-license information or the audio guide data added to the sample data is used for restricting the use of the sample data or for indicating the usage status. In contrast, the usage-license information or the audio guide data added to the additional data is used for updating the counterparts added to the sample data. That is, by obtaining the additional data, the user who possesses the sample data is able to increase the quality of the sample data, and also to update the usage-license information or replaces the audio guide data. For example, by obtaining additional data with usage-license information, the original data can be reconstructed from the sample data, and also, advertising audio data contained in the sample data can be erased, and the usage-license information can be updated so that the number of usage times or the usage expiry date becomes unlimited.

The usage-license information adder 68 outputs the sample data with usage-license information and audio guide data, as stated above. The usage-license information adder 68 also encrypts, if necessary, the additional data with usage-license information and audio guide data associated with the sample data, and outputs the resulting additional data.

Accordingly, by using the sample data and the additional data generated by the data separator 14, the original data can be reconstructed according to the processing described below.

Specific examples of sample data, additional data, and high-quality data (original data) are discussed below with reference to the data structures shown in FIG. 14.

Sample data 71 shown in FIG. 14 includes a header containing the content ID (CID), sample frames M1 through M8, usage-license information L1, and a plurality of audio guide frames G1 through G4. The sample frames M1 through M8 are generated by decreasing the quality of the coded frames of the original data, and the original data can be reconstructed from the sample frames M1 through M8 by using additional data 72, which is described below.

In the example of the sample data 71 shown in FIG. 14, the audio guide frames G1 and G2 are generated by coding the speech "sample data can be played back", and the audio guide frames G3 and G4 are generated by coding the speech "sample data cannot be played back".

The usage-license information L1 of the sample data 71 indicates at least one license condition and the part of the coded frames that can be played back under each condition. In the example in FIG. 14, the condition is set to be the number of playback times, and the part of the coded frames that can be played back is indicated for both the content data and the audio guide data.

In this example, when the license condition indicates that "the number of playback times is less than 4", the sample frames M1 through M8 are played back, and the audio guide frames G1 and G2 are also played back. When the license condition indicates that "the number of playback times is more than 3", that is, when the number of playback times is 4 or more, only the audio guide frames G3 and G4 are played back without playing back the sample frames. That is, for up to three playback times, all the sample frames are played back subsequent to the audio guidance "sample data can be played back", and when the number of playback times exceeds three, only the audio guidance "sample data cannot be played back" is played back. This enables the user to recognize that the sample data 71 is no longer valid.

The position at which the audio guide data is inserted into the sample data 71 and the number of items of guide data are not restricted. For example, if it is desired that the audio guide data be issued before playing back the sample frames, it is inserted at a position before the head of the frames (the left side in FIG. 14). If it is desired that the audio guide data be issued after playing back the sample frames, it is inserted at a position after the final sample frame (the right side in FIG. 14).

The audio guide frames can be coded by the same coding method as that used for the sample frames, in which case, it can be decoded according to processing similar to that for the sample frames. It is thus possible to simplify the configurations of the coding device 2 and the data playback device 5.

The additional data 72 shown in FIG. 14 includes a header containing the content ID (CID), additional frames S1 through S8, usage-license information L2, and audio guide frames G1' and G2'. The additional frames S1 through S8 contain data required for reconstructing the coded frames of the original data from the sample frames M1 through M8 of the sample data 71.

The audio guide frames G1' and G2' are audio guide data to be inserted into high-quality data 73, and are generated by coding the speech "the title is XX".

The usage license information L2 of the additional data 72 includes at least one license condition (in this example, an unlimited condition) for the high-quality data 73, a zone (high-quality frame zone) for coded frames whose quality must be increased from the sample data 71, a zone (erase frame zone) of coded frames to be erased from the sample data 71, and a zone (add frame zone) for coded frames to be added to the high-quality data 73.

That is, the license conditions, the zone of the content frames, and the zone of the audio guide frames indicated in the usage-license information L1 of the sample data 71 are changed to those indicated in the usage-license information L2 of the additional data 72. The coded frames in the erase frame zone indicated in the usage-license information L2 are erased from the sample data 71, and the coded frames in the add frame zone indicated in the usage-license information L2 are inserted into the high-quality data 73 from the additional frame 72.

Information M1 through M8 in the sample data 71 are used for associating the additional frames S1 through S8 contained in the additional frame 72 with the sample frames M1 through M8, and also contain the positions of the sample frames M1 through M8 in the sample data 71 if necessary.

If the additional frames contained in the additional data 72 are associated with only part of the sample frames M1 through M8 of the sample data 71, the high-quality frame zone indicates the corresponding sample frames. For example, if only the additional frames S1 through S4 are contained in the additional data 72, the high-quality frame zone indicated in the usage-license information L2 should be M1 through M4, and the quality of the sample frames M5 through M8 is not increased. Accordingly, as long as the high-quality frame zone indicated in the usage-license information L2 of the additional data 72 is consistent with the additional frames contained in the additional data 72, the high-quality frame zone and the number of frames can be set as desired.

Information concerning the erase frame zone indicating the frames to be erased from the sample data 71 contains information concerning the positions thereof if necessary, and indicates coded frames of the content data or the audio guide data that should be erased when increasing the quality of the sample data 71. The erase frame zone and the number of frames can be set as desired.

Information concerning the add frame zone indicating the frames to be added to the sample data 71 contains information concerning the positions thereof if necessary, and indicates coded frames of the content data or the audio guide data that should be added to the high-quality data 73 when increasing the quality of the sample data 71. As long as coded frames of the content data or the audio guide data to be added are contained in the additional data 72, the add frame zone and the number of frames can be set as desired.

The high-quality data 73 shown in FIG. 14 is data to be reconstructed by using the above-described sample data 71 and additional data 72. The high-quality data 73 includes a header containing the content ID (CID), high-quality coded frames C1 through C8, usage-license information L3, and audio guide frames G1' and G2'. The coded frames C1 through C8 are generated by using the sample frames M1 through M8 and the additional frames S1 through S8.

The usage-license information L3 of the high-quality data 73 indicates part of the data contained in the usage-license information L2 of the additional data 72, i.e., at least one license condition and the zone of coded frames that can be played back under each condition. In the example shown in FIG. 14, the zone of coded frames is indicated for both the content data and the audio guide data.

The audio guide frames G1' and G2' are originally contained in the additional data 72, and are coded frames that are inserted when increasing the quality of the sample data 71. In this example, the audio guide frames G1' and G2' are generated by coding the speech "the title is XX". That is, based on the usage-license information L2 of the additional data 72, the audio guide frames G1 through G4 of the sample data 71 are erased, and the audio guide frames G1' and G2' contained in the additional data 72 are inserted.

In this example, the license conditions are updated so that the high-quality coded frames C1 through C8 can be played back without limit, and so that the audio guide frames G1' and G2' can also be played back. That is, when playing back the high-quality data 73, the high-quality coded frames C1 through C8 are played back subsequent to the audio guidance, i.e., "the title is XX". The audio guide frames G1' and G2' do not have to be contained in the additional data 72, in which case, audio guide data is excluded from the high-quality data 73. Alternatively, a function for designating whether audio guide data is played back may be provided for the data playback device 5 that plays back the sample data 71 or the high-quality data 73, in which case, it is possible to select whether the audio guide data is played back.

In FIG. 14, the license condition is the number of playback times. Alternatively, the playback expiry date, the playback period, or the playback time may be set to be the license condition. If the license condition contains the playback expiry date, it may be determined whether the condition is satisfied by using a calendar function. If the license condition contains the playback period, it may be determined whether the condition is satisfied by using a calendar function or a timer function. If the license condition contains the accumulated value of the playback time, it can be determined whether the condition is satisfied by using a timer function and a memory function.

If the license condition contains the number of playback times, it can be determined whether the condition is satisfied by using a counter function and a memory function.

The type of license condition is not a limitation to implement the present invention.

The audio guide data is not restricted to the playback status of the sample data 71 or the high-quality data 73. Instead, advertisements of content, creator's messages, descriptions of the place and the method for obtaining the additional data 72, the license conditions and the method for using the sample data 71 or the high-quality data 73, etc. may be output as the audio guide data. Common audio guide data may be used for all the items of content. Alternatively, the audio guide data may be set for each item of content, in which case, advertisements and sales promotion of the content can be effectively achieved.

Sample-data generation processing is described below with reference to the flowchart of FIGS. 15 and 16.

In step S1, the controller 61 of the data separator 14 obtains setting values for a permitted sample zone input from an operation input unit (not shown). As described with reference to FIGS. 11 and 12, it is assumed that the quantizing units [1] through [12] are specified as the sample band, the sample start position is the head of the content, and the sample zone length is the entire content. That is, the bands of all the coded frames are restricted by the quantizing units [1] through [12]. The controller 61 supplies the setting values of the sample zone to the band-restriction processor 63.

In step S2, the band-restriction processor 63 sequentially receives frames contained in the original data, that is, frames that can be played back with high audio quality described with reference to FIG. 9.

In step S3, it is determined based on the setting values obtained in step S1 whether an input coded frame is contained in the sample zone, and if so, the band-restriction processor 63 replaces the normalizing coefficients of the tone components outside the sample band by, for example, a dummy value of 0. Accordingly, the spectrum coefficients of the tone components outside the sample band can be minimized when the coded frame is played back. In contrast, if the input coded frame is not contained in the sample zone, the band-restriction processor 63 replaces the normalizing coefficients of all the tone components by, for example, a dummy value of 0. Then, the spectrum coefficients of all the tone components are minimized when the coded frame is played back.

Also in step S3, the band-restriction processor 63 supplies the true values of the normalizing coefficients of the tone components replaced by the dummy value to the additional-frame generator 65 so that they can be contained in the additional data in step S6, which is described below.

In step S4, if it is determined that the input coded frame is contained in the sample zone, the band-restriction processor 63 replaces the normalizing coefficients of the non-tone components outside the sample band by, for example, a dummy value of 0. Accordingly, the spectrum coefficients of the non-tone components outside the sample band are minimized when the coded frame is played back. Conversely, if the input coded frame is not contained in the sample zone, the band-restriction processor 63 replaces the normalizing coefficients of all the non-tone components by, for example, a dummy value of 0. Then, the spectrum coefficients of all the non-tone components are minimized when the coded frame is played back.

Also in step S4, the band-restriction processor 63 supplies the true values of the normalizing coefficients of the non-tone components replaced by the dummy value to the additional-frame generator 65 so that they can be contained in the additional data in step S6, which is described below.

In step S5, if the input coded frame is contained in the sample zone, the spectrum-coefficient information overwriter 64 replaces part of the spectrum-coefficient information of the non-tone components in bands higher than the sample band by dummy values that prevent the true values from being predicted. In contrast, if the input coded frame is not contained in the sample zone, the spectrum-coefficient information overwriter 64 replaces part of the spectrum-coefficient information of certain non-tone components by dummy values that prevent the true values from being predicted. Then, the spectrum-coefficient information overwriter 64 supplies the true values to the additional-frame generator 65 so that they can be contained in the additional frame in step S6.

In step S6, the additional-frame generator 65 records in the additional frame, as shown in FIG. 13, the normalizing-coefficient information of the tone components and the normalizing-coefficient information of the non-tone components supplied from the band-restriction processor 63, and the spectrum-coefficient information of the non-tone components supplied from the spectrum-coefficient information overwriter 64, thereby generating additional data.

After step S6, the controller 61 determines in step S7 whether the processed frame is the final frame. If the outcome of step S7 is no, the process returns to step S2, and step S2 and the subsequent steps are repeated.

If it is found in step S7 that the processed frame is the final frame, the process proceeds to step S8. In step S8, the sample-data generator 66 generates the header of the sample data, adds the header to each sample frame, and supplies the sample data to the usage-license information adder 68.

In step S9, the additional-data generator 67 generates the header of the additional data, adds the header to each additional frame, and supplies the additional data to the usage-license information adder 68.

In step S10, the controller 61 obtains setting values for usage license information and audio guide data input from an operation input unit (not shown). The controller 61 then supplies the setting values for the usage license information to the usage-license information adder 68.

In step S11, the usage-license information adder 68 adds the usage license information and the audio guide data to the sample data supplied from the sample-data generator 66, as described with reference to FIG. 14, based on the setting values of the usage license information supplied from the controller 61.

More specifically, if the number of playback times of the sample data is permitted up to three, the license condition is set to be "the number of playback times is less than four".

Then, the zone of coded frames that can be played back under the license condition is set to be M1 through M8, and the zone of audio guide frames that can be played back under the license condition is set to be G1 and G2. Also, the condition for prohibiting the playback operation of the content is set to be "the number of playback times is more than three", and the zone of audio guide frames that are played back under this license condition is G3 and G4.

In step S12, the usage-license information adder 68 adds the usage license information and the audio guide data to the additional data supplied from the additional-data generator 67, as described with reference to FIG. 14, based on the setting values for the usage license information supplied from the controller 61. The sample-data generation processing is then completed.

If the playback operation of the high-quality content data is not restricted, the license condition is set to be "unlimited", and the zone of high-quality coded frames that can be played back under this license condition is set to be C1 through C8, and the zone of audio guide frames that can be played back under this license condition is set to be G1' and G2'.

Figure 15:
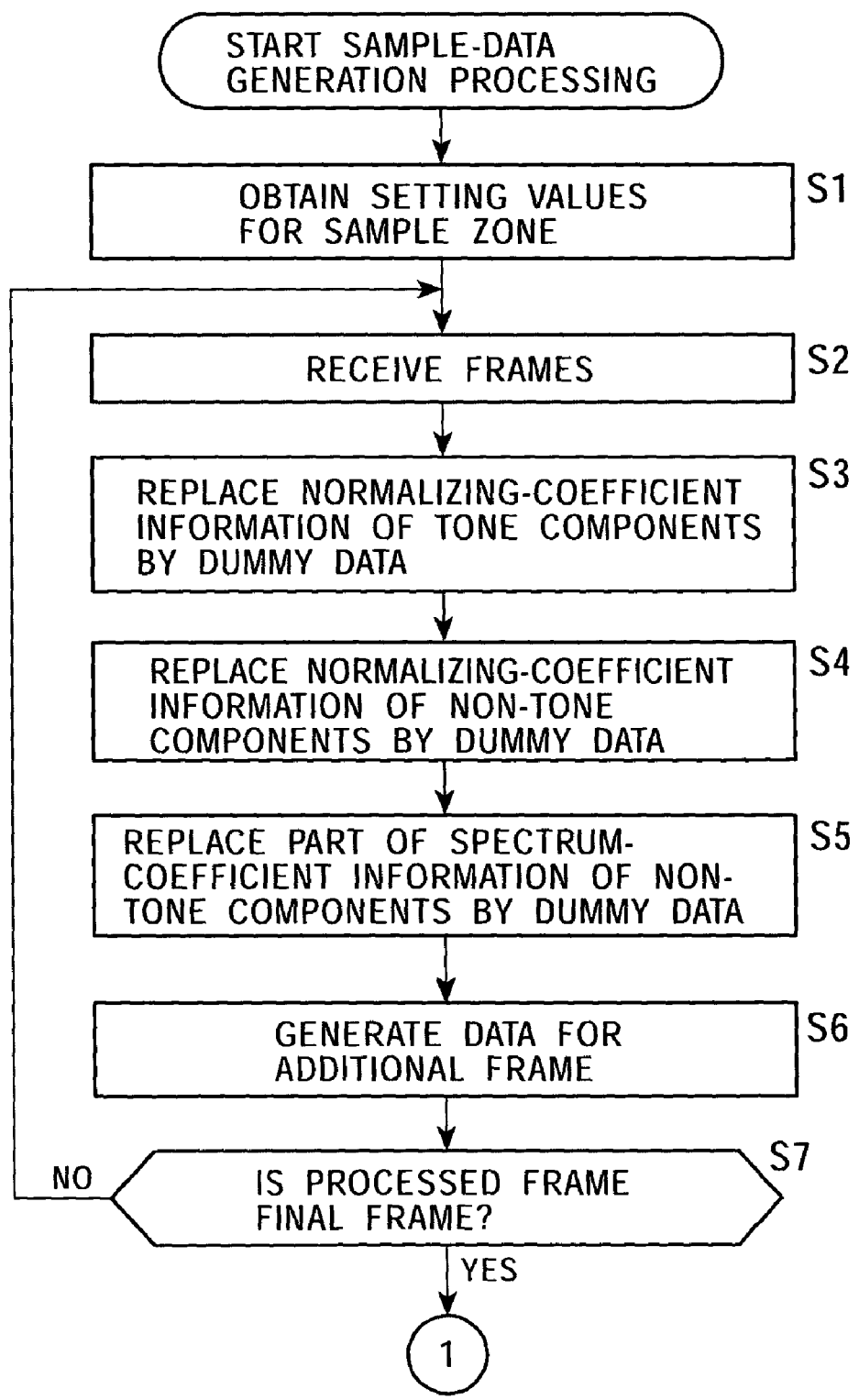
FIGS. 15 and 16 are a flowchart illustrating sample-data generation processing.
Figure 16:
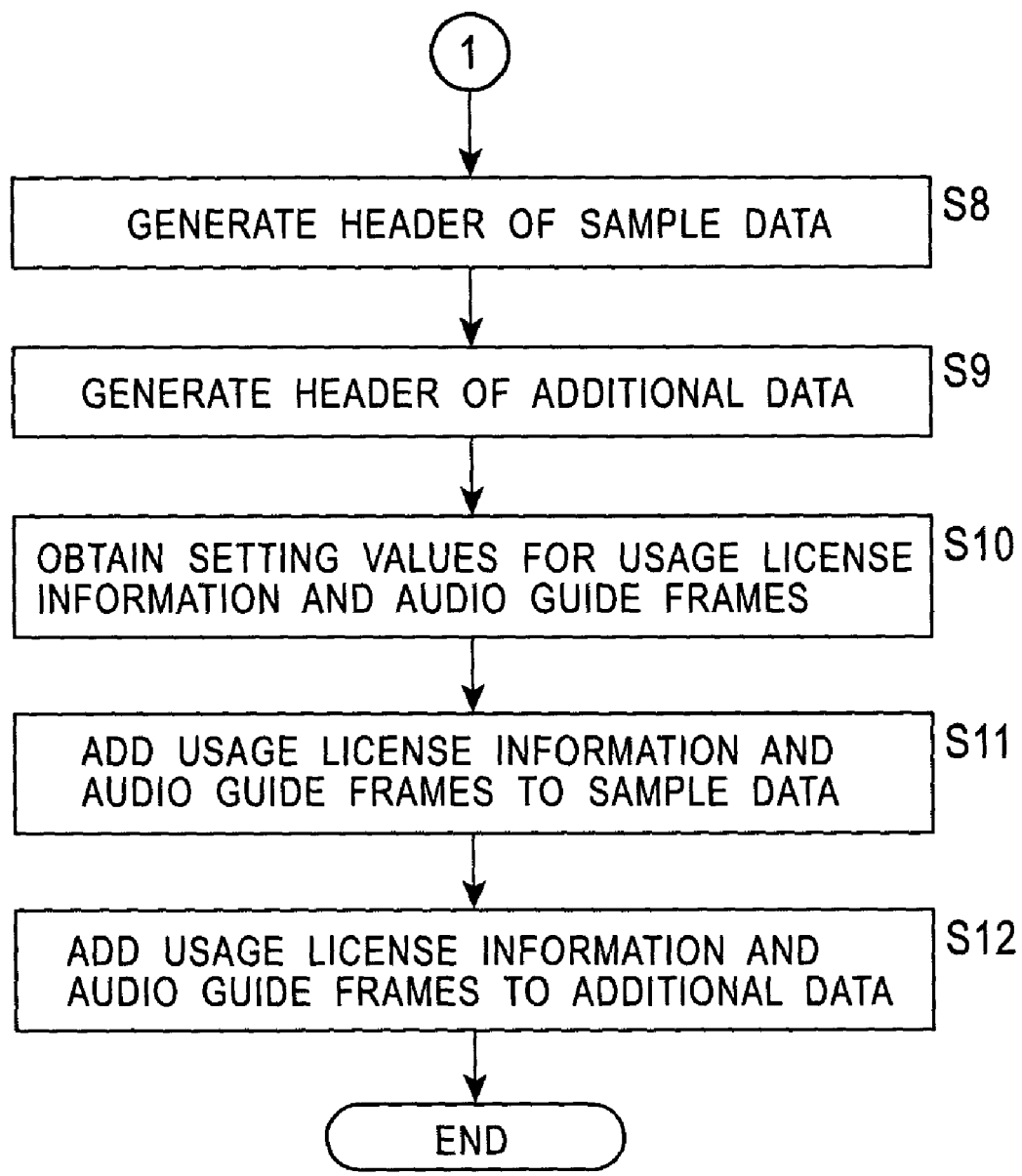

According to the processing indicated by the flowchart of FIGS. 15 and 16, sample data that can be played back with low quality accompanied by audio guide data based on the designated license condition, and additional data to be obtained by a user who has previewed or listened to the sample data when increasing the quality of the sample data can be generated.

The sample data generated as described above is distributed to users via the Internet or is recorded in various recording media possessed by users by using a MMK installed in a store. If a user likes the content after previewing or listening to the sample data, the user is able to obtain the additional data by paying a predetermined amount of money to the distributor of the content data. The user is able to reconstruct the original data by increasing the quality of the sample data by using the obtained additional data, and also, updates the usage license information so as to decode and play back the high-quality data or to record it in a recording medium.

A description is now given of processing when sample data is decoded and is output or played back, or when original data is reconstructed from sample data and additional data and is output or played back.

Figure 17:
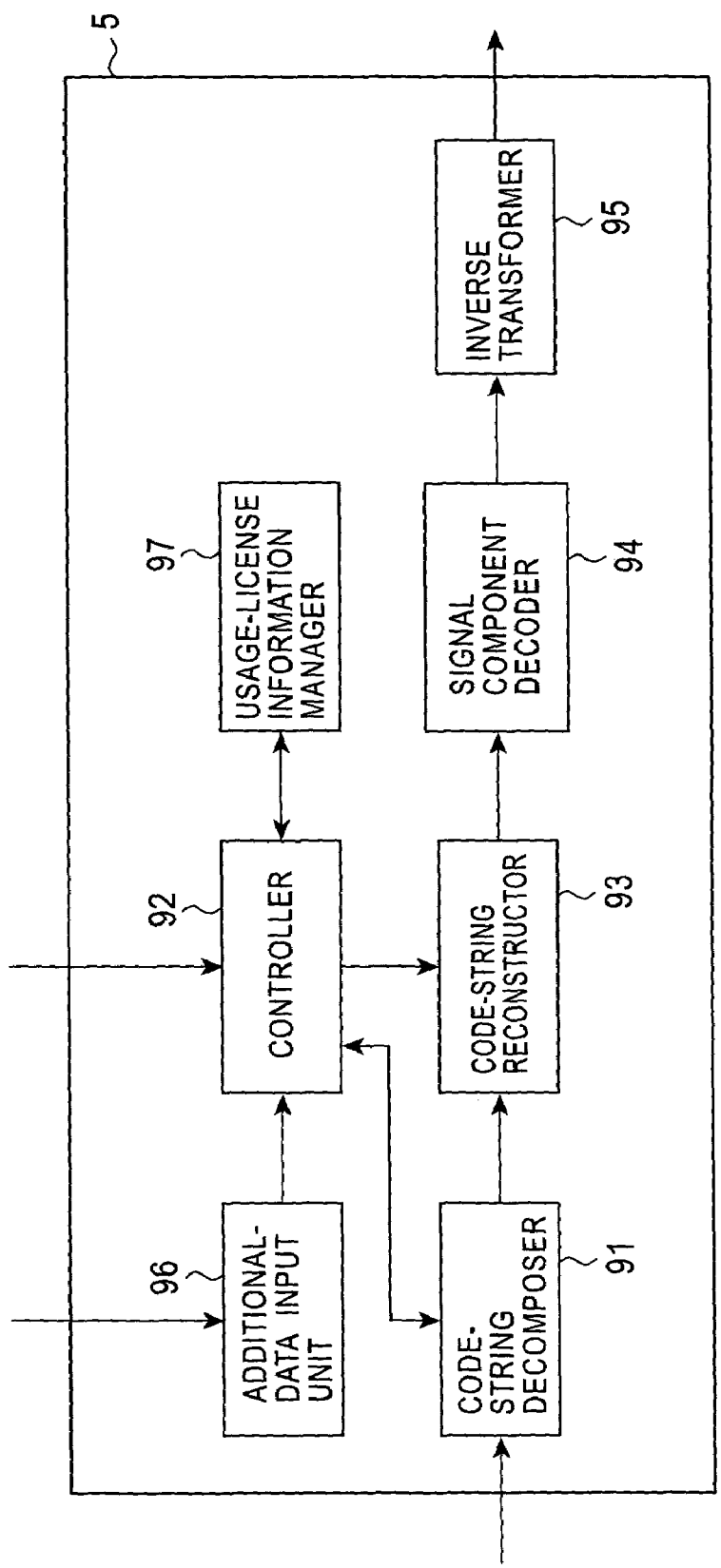
FIG. 17 is a block diagram illustrating the configuration of a data playback device to which the present invention is applied.

FIG. 17 is a block diagram illustrating the configuration of the data playback device 5.

A code-string decomposer 91 receives coded frames of sample data and decomposes a code string to extract the codes of the signal components, and outputs them to a code-string reconstructor 93. If usage license information is contained in the decomposed code string, the code-string decomposer 91 outputs the usage license information to a controller 92.

Upon receiving information input from a user through an operation input unit (not shown), the controller 92 determines whether the data input into the code-string decomposer 91 is played back with high quality or low quality, and controls an additional-data input unit 96, the code-string reconstructor 93, and a usage-license information manager 97.

The controller 92 outputs the usage license information supplied from the code-string decomposer 91 to the usage-license information manager 97, and stores it therein. When the sample data is played back, the controller 92 refers to the usage license information stored in the usage-license information manager 97, and determines whether the sample data can be played back. If the playback operation of the sample data is permitted, the controller 92 controls the code-string reconstructor 93 to supply coded frames and audio guide frames of the sample data supplied from the code-string decomposer 91 to a signal component decoder 94.

The usage-license information manager 97 stores, changes, or updates the supplied usage license information under the control of the controller 92.

Upon receiving additional data, if the additional data is encrypted, the additional-data input unit 96 decrypts the encrypted additional data, identifies usage license information, audio guide data, and additional frames, and supplies them to the controller 92.

When a high-quality operation is performed, the controller 92 controls the additional-data input unit 96 to obtain the additional data. The controller 92 also controls the usage-license information manager 97 to update the stored usage license information based on the usage license information of the additional data, and controls the code-string reconstructor 93 to increase the quality of the sample frames, and erase and insert the audio guide frames based on the usage license information of the additional data.

That is, when the high-quality operation is performed, the code-string reconstructor 93 reconstructs high-quality coded frames from the sample frames supplied from the code-string decomposer 91 by using the additional frames supplied from the controller 92, and supplies the reconstructed coded frames to the signal component decoder 94. The code-string reconstructor 93 then transfers coded frames indicated in the add frame zone supplied from the controller 92 to the signal component decoder 94, and erases coded frames indicated in the erase frame zone supplied from the code-string decomposer 91 under the control of the controller 92.

If the use of the content is restricted by the number of playback times or the playback time, the controller 92 controls the usage-license information manager 97 to update the usage license information by counting the current number of playback times with a counter or by counting the accumulated value of the current playback time with a timer.

Figure 18:
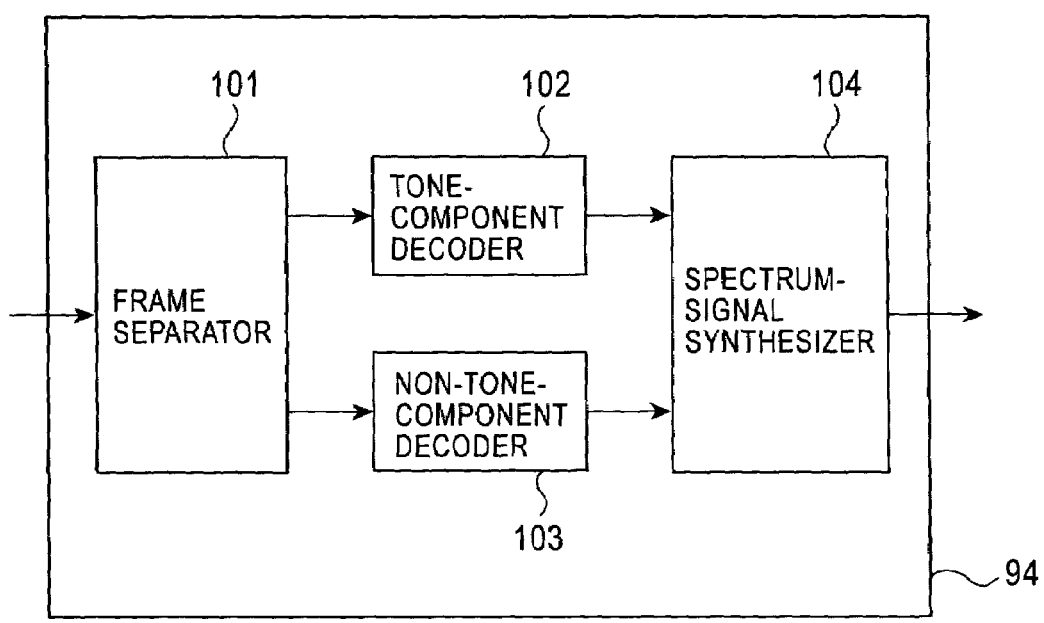
FIG. 18 is a block diagram illustrating the configuration of a signal component decoder shown in FIG. 17.

The signal component decoder 94 decodes the input sample data or the high-quality coded frames. FIG. 18 is a block diagram illustrating the detailed configuration of the signal component decoder 94 for decoding input coded frames into tone components and non-tone components when the coded frames are coded by being separated into tone components and non-tone components.

A frame separator 101 receives a coded frame, such as that shown in FIG. 9 or 11, and separates it into tone components and non-tone components. The tone components are output to a tone-component decoder 102, and the non-tone components are output to a non-tone-component decoder 103.

Figure 19:
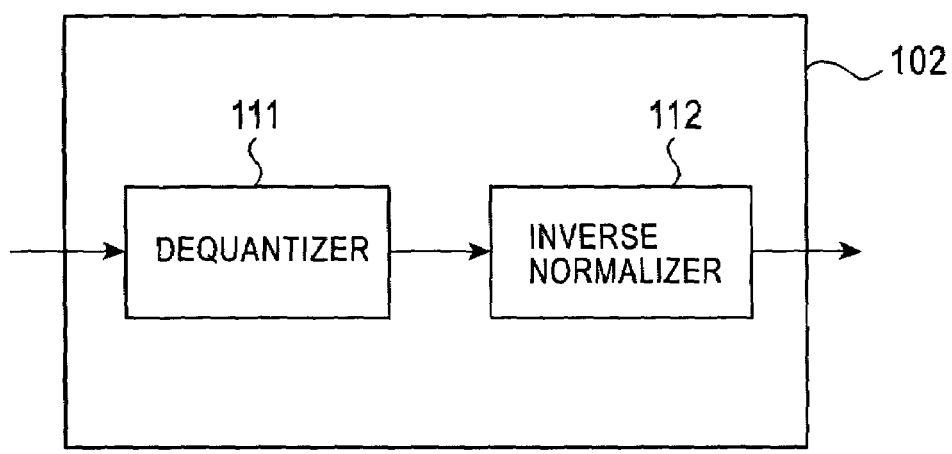
FIG. 19 is a block diagram illustrating the configuration of a tone-component decoder shown in FIG. 18.

FIG. 19 is a block diagram illustrating the detailed configuration of the tone-component decoder 102. A dequantizer 111 dequantizes input coded data and outputs the dequantized data to an inverse normalizer 112. The inverse normalizer 112 inverse-normalizes the input data. That is, decoding processing is performed by the dequantizer 111 and the inverse normalizer 112 so as to output a spectrum signal of the tone components.

Figure 20:
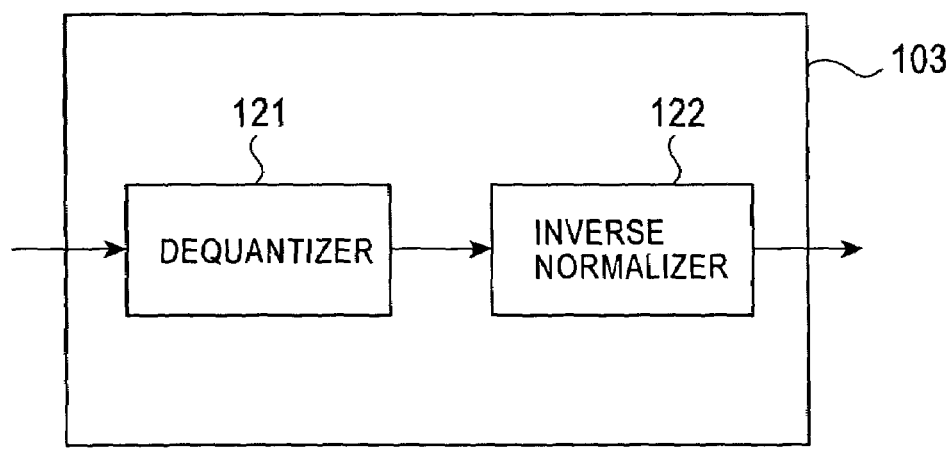
FIG. 20 is a block diagram illustrating the configuration of a non-tone-component decoder shown in FIG. 18.

FIG. 20 is a block diagram illustrating the detailed configuration of the non-tone-component decoder 103. A dequantizer 121 dequantizes input coded data and outputs the dequantized data to an inverse normalizer 122. The inverse normalizer 122 inverse-normalizes the input data. That is, decoding processing is performed by the dequantizer 121 and the inverse normalizer 122 so as to output a spectrum signal of the non-tone components.

A spectrum-signal synthesizer 104 receives the spectrum signal components output from the tone-component decoder 102 and the non-tone component decoder 103, and combines the spectrum signal components. The spectrum-signal synthesizer 104 generates the spectrum signal shown in FIG. 6 for high-quality data, or generates the spectrum signal shown in FIG. 12 for sample data, and then outputs the spectrum signal to an inverse transformer 95.

If the coded data is coded without being divided into tone components and non-tone components, the frame separator 101 can be omitted, and decoding processing is performed by using one of the tone-component decoder 102 and the non-tone-component decoder 103.

Figure 21:
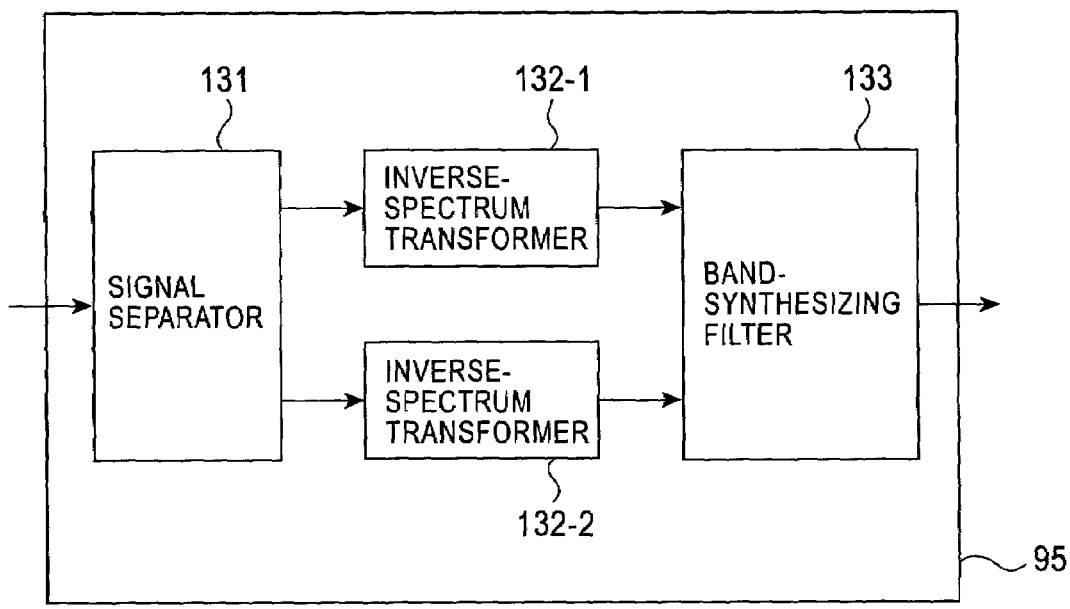
FIG. 21 is a block diagram illustrating the configuration of an inverse transformer shown in FIG. 17.

FIG. 21 is a block diagram illustrating the detailed configuration of the inverse transformer 95.

A signal separator 131 separates a signal based on the number of divided bands indicated in the header of an input coded frame. In this case, the number of divided bands is two, and the signal separator 131 separates the input spectrum signal into two bands, and outputs them to inverse-spectrum transformers 132-1 and 132-2.

The inverse-spectrum transformers 132-1 and 132-2 perform inverse-spectrum transform on the input spectrum signal components, and outputs the transformed signal components in the corresponding bands to a band-synthesizing filter 133. The band-synthesizing filter 133 combines the input signal components, and outputs the resulting synthesized signal.

The signal (for example, an audio PCM signal) output from the band-synthesizing filter 133 is converted into analog data by a digital-to-analog (D/A) converter (not shown), and may be output from a speaker (not shown) as sound. The signal output from the band-synthesizing filter 133 may be output to another device via a network.

Figure 22:
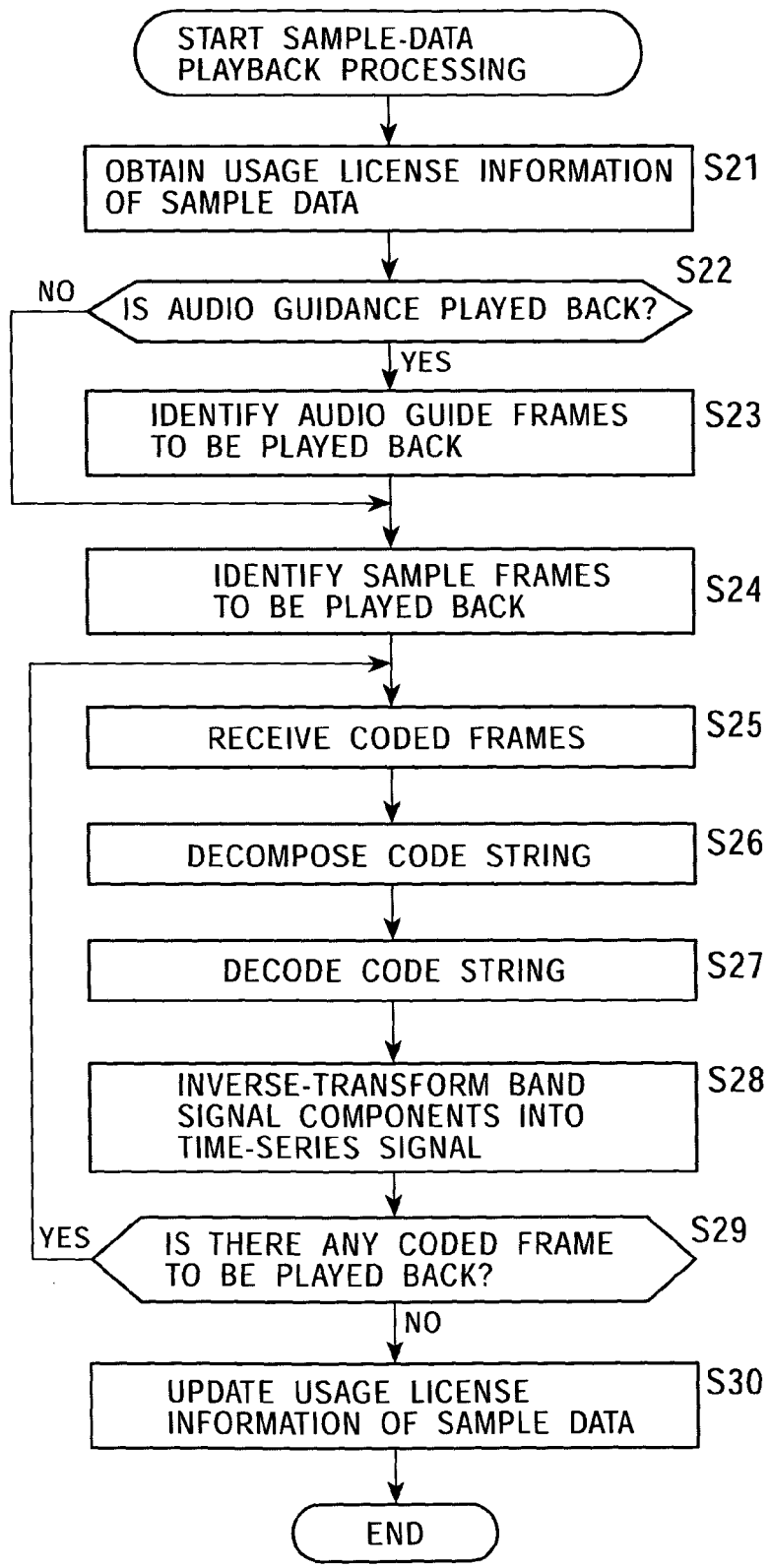
FIG. 22 is a flowchart illustrating sample-data playback processing.

Sample-data playback processing performed by the data playback device 5 shown in FIG. 17 is described below with reference to the flowchart of FIG. 22.

In step S21, the controller 92 obtains usage license information of the sample data from the usage-license information manager 97, and also identifies the current usage status, for example, the number of playback times or the playback time, of the sample data.

In step S22, the controller 92 determines whether audio guide data is to be played back according to an operation input from the user through the data playback device 5. If the outcome of step S22 is yes, the process proceeds to step S23 in which the controller 92 identifies audio guide frames in the sample data to be played back based on the usage license information and the current usage status. The process then proceeds to step S24.

For example, if the number of playback times upon receiving the sample data 71 shown in FIG. 14 is less than 4, the controller 92 identifies the audio guide frames G1 and G2 as the coded frames to be played back. If the number of playback times is 4 or more, the controller 92 identifies the audio guide frames G3 and G4 as the coded frames to be played back. If it is found in step S22 that audio guide data is not played back, the process proceeds to step S24.

In step S24, the controller 92 identifies sample frames in the sample data to be played back based on the usage license information and the current usage status of the sample data obtained in step S21. For example, if the number of playback times upon receiving the sample data 71 shown in FIG. 14 is less than 4, the controller 92 identifies the sample frames M1 through M8 as the coded frames to be played back. If the number of playback times is 4 or more, the controller 92 determines that there is no sample frame to be played back.

In step S25, the code-string decomposer 91 receives coded frames of the sample data. In step S26, under the control of the controller 92, the code-string decomposer 91 decomposes coded frames that can be played back under the condition indicated in the usage license information, and outputs the decomposed coded frames to the code-string reconstructor 93. If the number of playback times upon receiving the sample data 71 shown in FIG. 14 is less than 4, the audio guide frames G1 and G2 and the sample frames M1 through M8 are decomposed and are sequentially supplied to the code-string reconstructor 93. If the number of playback times is 4 or more, the audio guide frames G3 and G4 are decomposed and are sequentially supplied to the code-string reconstructor 93.

The code-string reconstructor 93 then transfers the decomposed code string to the signal component decoder 94 under the control of the controller 92. In step S27, the signal component decoder 94 divides the input code string into tone components and non-tone components, and decodes them by dequantizing and inverse-transforming them so as to generate spectrum signal components. The signal component decoder 94 then combines the generated spectrum signal components and outputs the synthesized spectrum signal to the inverse transformer 95.

In step S28, the inverse transformer 95 separates the input spectrum signal into bands if necessary, and inverse-spectrum transforms the separated signal components. The transformed signal components are then combined, and the combined signal is inverse-transformed into a time-series signal.

After step S28, the controller 92 determines in step S29 whether there is a coded frame to be played back among the audio guide frames identified in step S23 or the sample frames identified in step S24.

If it is found in step S29 that there is a coded frame to be played back, the process returns to step S25, and step S25 and the subsequent steps are repeated. If it is found in step S29 that there is no coded frame to be played back, the process proceeds to step S30.

In step S30, the usage-license information manager 97 updates the number of playback times or the playback time as the usage status of the sample data, and the sample-data playback processing is completed.

Figure 23:
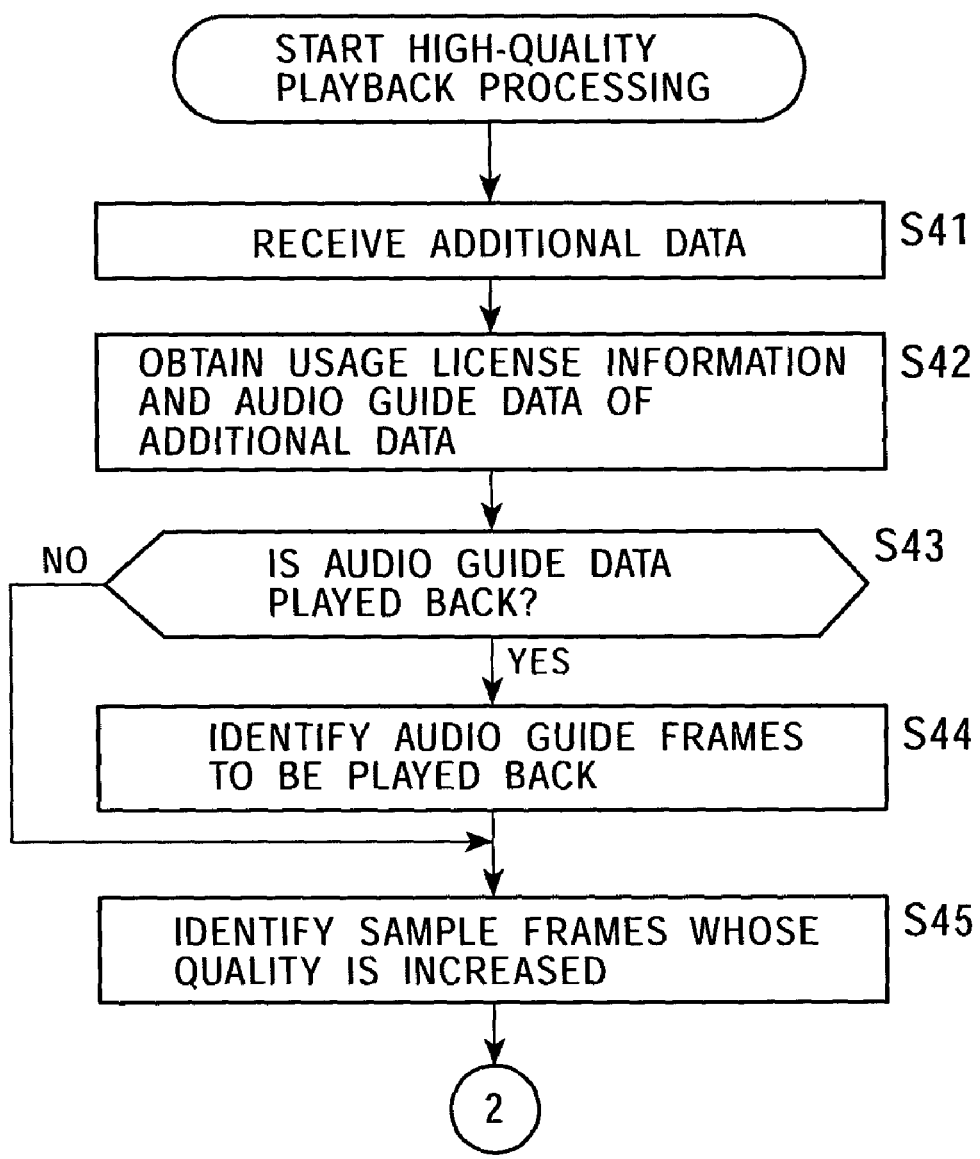
FIGS. 23 and 24 are a flowchart illustrating high-quality playback processing.

High-quality playback processing performed by the data playback device 5 shown in FIG. 17 is now described with reference to the flowchart of FIGS. 23 and 24.

In step S41, under the control of the controller 92, upon receiving additional data, if the additional data is encrypted, the additional-data input unit 96 decrypts the additional data, identifies usage license information, audio guide data, and additional frames, and supplies them to the controller 92.

In step S42, the controller 92 obtains the usage license information and the audio guide data supplied from the additional-data input unit 96, and also updates the usage license information stored in the usage-license information manager 97 based on the information contained in the additional data so as to identify the current usage status, such as the number of playback times or the playback time, of the high-quality data.

In step S43, the controller 92 determines whether the audio guide data is to be played back according to an operation input from the user through the data playback device 5. If the outcome of step S43 is yes, the process proceeds to step S44. In step S44, the controller 92 identifies audio guide frames to be played back based on the usage license information and the current usage status, and proceeds to step S45. If the additional data 72 shown in FIG. 14 is received, the controller 92 identifies the audio guide frames G1' and G2' contained in the additional data as the coded frames to be played back rather than the audio guide frames G1 through G4 contained in the sample data. If it is determined in step S43 that the audio guide data is not played back, the process proceeds to step S45.

In step S45, the controller 92 identifies sample frames in the sample data whose quality is to be increased based on the usage license information and the current usage status of the additional data obtained in step S42. If the additional data 72 shown in FIG. 14 is received, the controller 92 identifies the sample frames M1 through M8 as the coded frames whose quality is to be increased.

In step S46, the code-string decomposer 91 receives the coded frames of the sample data. Then, in step S47, the code-string decomposer 91 decomposes the input code string and outputs the decomposed code string to the code-string reconstructor 93. If the sample data 71 shown in FIG. 14 is received, the sample frames M1 through M8 are sequentially supplied to the code-string reconstructor 93.

In step S48, the code-string reconstructor 93 determines whether the code string supplied from the code-string decomposer 91 is audio guide data. If the outcome of step S48 is yes, the process proceeds to step S50. If the controller 92 supplies the audio guide frames contained in the additional data to the code-string reconstructor 93 based on the usage license information of the additional data, it is also determined in step S48 that the supplied code string is audio guide data. Accordingly, the process proceeds to step S50.

In contrast, if it is determined in step S48 that the code string supplied to the code-string reconstructor 93 is not audio guide frames, that is, if it is determined that the code string indicates sample frames, the controller 92 supplies the additional frames associated with the sample frames to the code-string reconstructor 93. The code-string reconstructor 93 then performs code-string reconstruction processing in step S49, which is described below, indicated by the flowchart of FIG. 25, so as to reconstruct the coded frames of the original data from the sample frames by using the additional frames supplied from the controller 92. In the example shown in FIG. 14, the sample frames M1 through M8 are sequentially supplied to the code-string reconstructor 93 from the code-string decomposer 91, and simultaneously, the additional frames S1 through S8 are sequentially supplied to the code-string reconstructor 93 from the controller 92.

In step S50, the signal component decoder 94 divides the input code string into tone components and non-tone components, and decodes them by dequantizing and inverse-transforming them so as to generate spectrum signal components. The signal component decoder 94 then combines the generated spectrum signal components and outputs the synthesized spectrum signal to the inverse transformer 95.

In step S51, the inverse transformer 95 separates the input spectrum signal into bands if necessary, and inverse-spectrum transforms the separated signal components. The transformed signal components are then combined, and the combined signal is inverse-transformed into a time-series signal.

After step S51, the controller 92 determines in step S52 whether there is a coded frame to be played back among the audio guide frames identified in step S44 or the sample frames whose quality is to be increased identified in step S45.

If it is determined in step S52 that there is a coded frame to be played back, the process returns to step S46, and step S46 and the subsequent steps are repeated. If it is found in step S52 that there is no coded frame to be played back, the process proceeds to step S53.

In step S53, the usage-license information manager 97 updates the usage license information of the sample data based on the usage license information of the additional data obtained in step S42, and also, updates the usage status, such as the number of playback times or the playback time, of the high-quality data if necessary. The high-quality playback processing is then completed.

The time-series signal generated by being inverse-transformed by the inverse transformer 95 is converted into analog data by a D/A converter (not shown), and may be output from a speaker (not shown). Alternatively, the signal may be output to another device via a network (not shown).

In this example, it is assumed that the sample data is coded by being separated into tone components and non-tone components. However, if the sample data is not separated into tone components and non-tone components, reconstruction processing and playback processing similar to those described above can also be performed.

Figure 24:
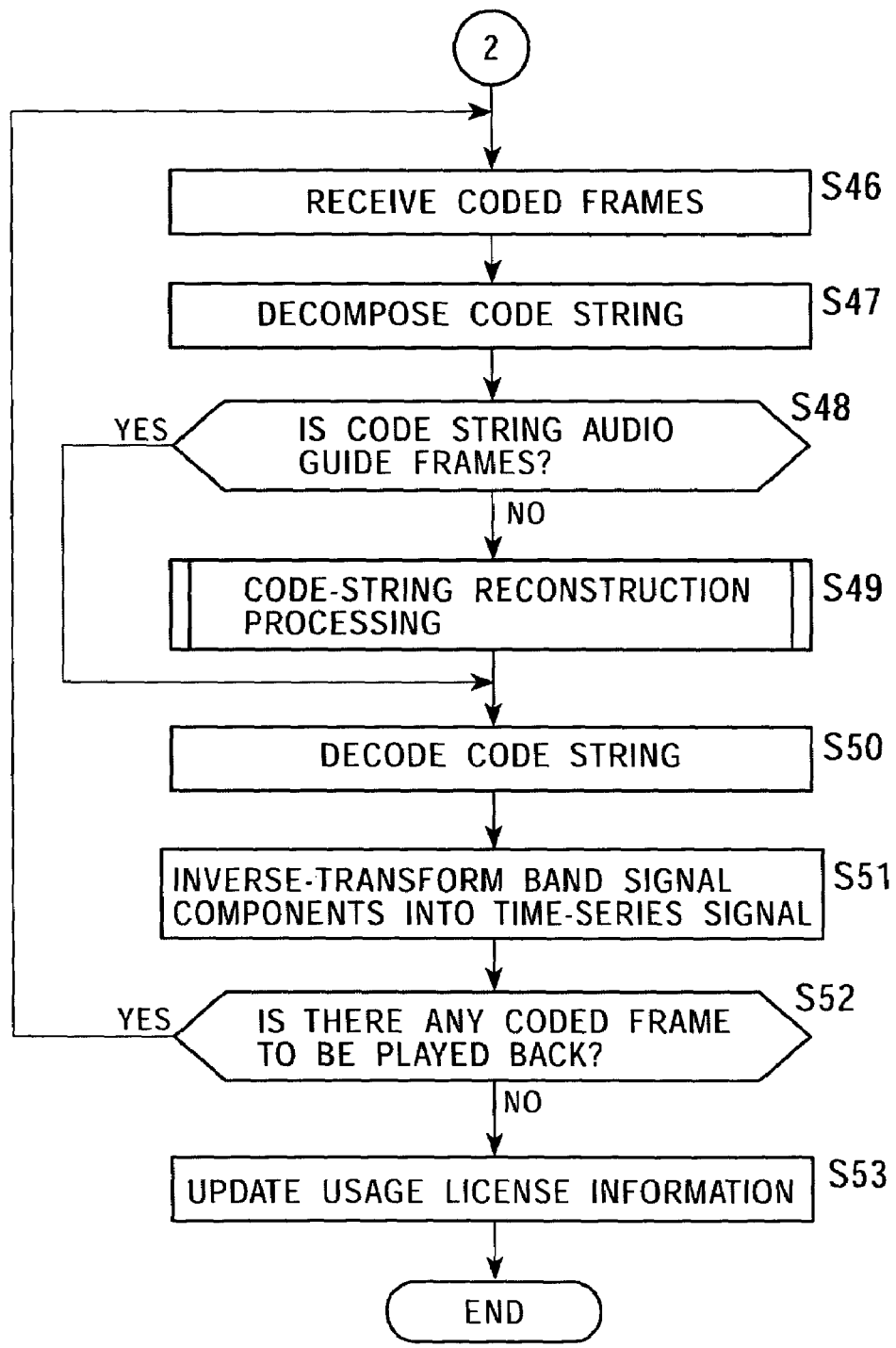

Details of the code-string reconstruction processing performed in step S49 of FIG. 24 are described below with reference to the flowchart of FIG. 25.

In step S61, the code-string reconstructor 93 receives sample frames supplied from the code-string decomposer 91. Then, in step S62, the controller 92 supplies additional frames associated with the sample frames to the code-string reconstructor 93.

In step S63, the code-string reconstructor 93 reconstructs the normalizing-coefficient information of the tone components of the input sample frames based on the normalizing-coefficient information of the tone components indicated in the input additional frames.

In step S64, the code-string reconstructor 93 reconstructs the normalizing-coefficient information of the non-tone components of the input sample frames based on the normalizing-coefficient information of the non-tone components indicated in the input additional frames.

In step S65, the code-string reconstructor 93 reconstructs part of the spectrum-coefficient information of the non-tone components of the input sample frames based on the spectrum-coefficient information of the non-tone components indicated in the input additional frames.

Figure 28:
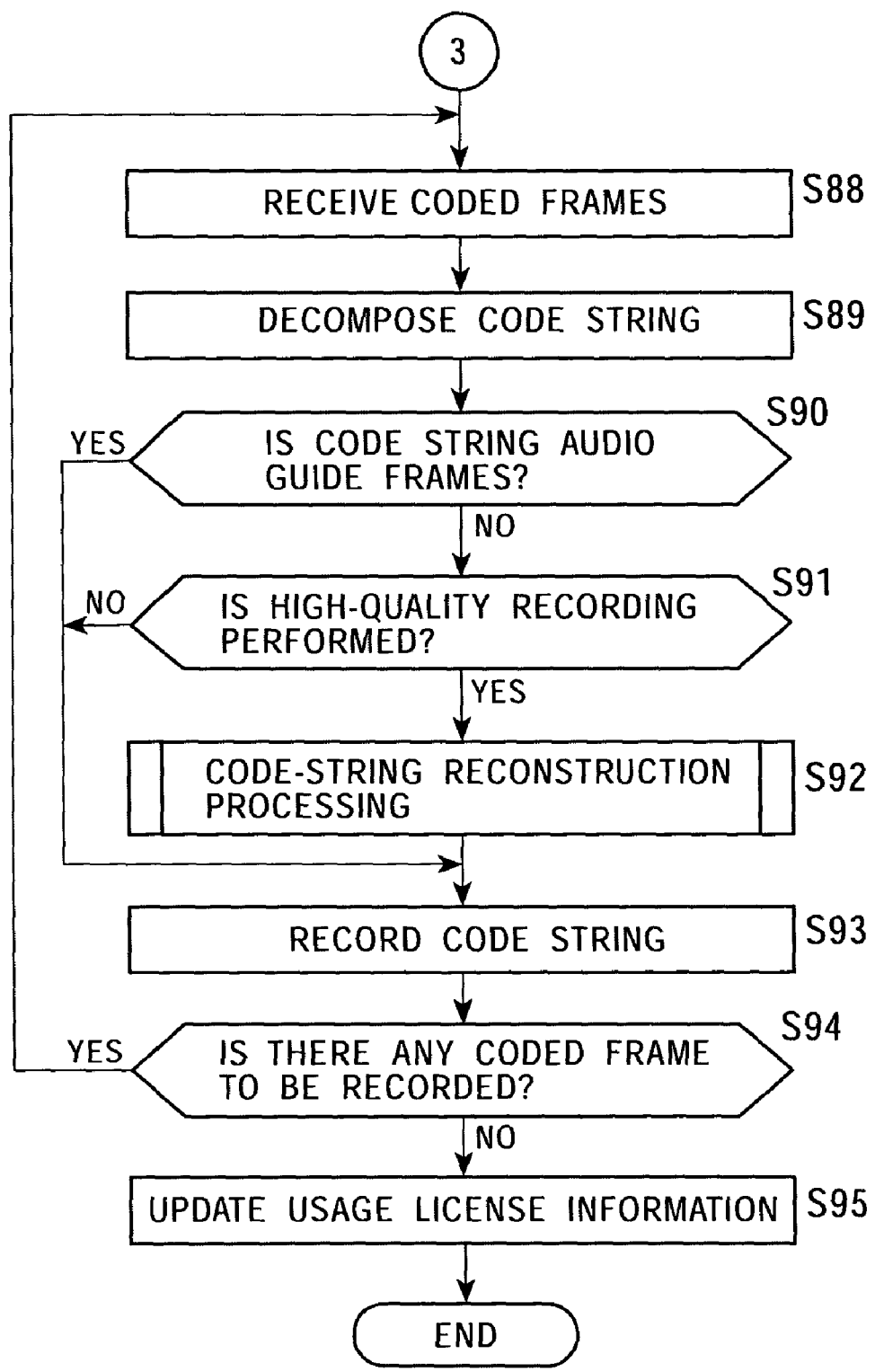

After step S65, the code-string reconstructor 93 completes the code-string reconstruction processing, and if the high-quality playback operation is performed, the process returns to step S50 of FIG. 24, and if the high-quality recording operation is performed, the process returns to step S93 of FIG. 28.

Figure 25:
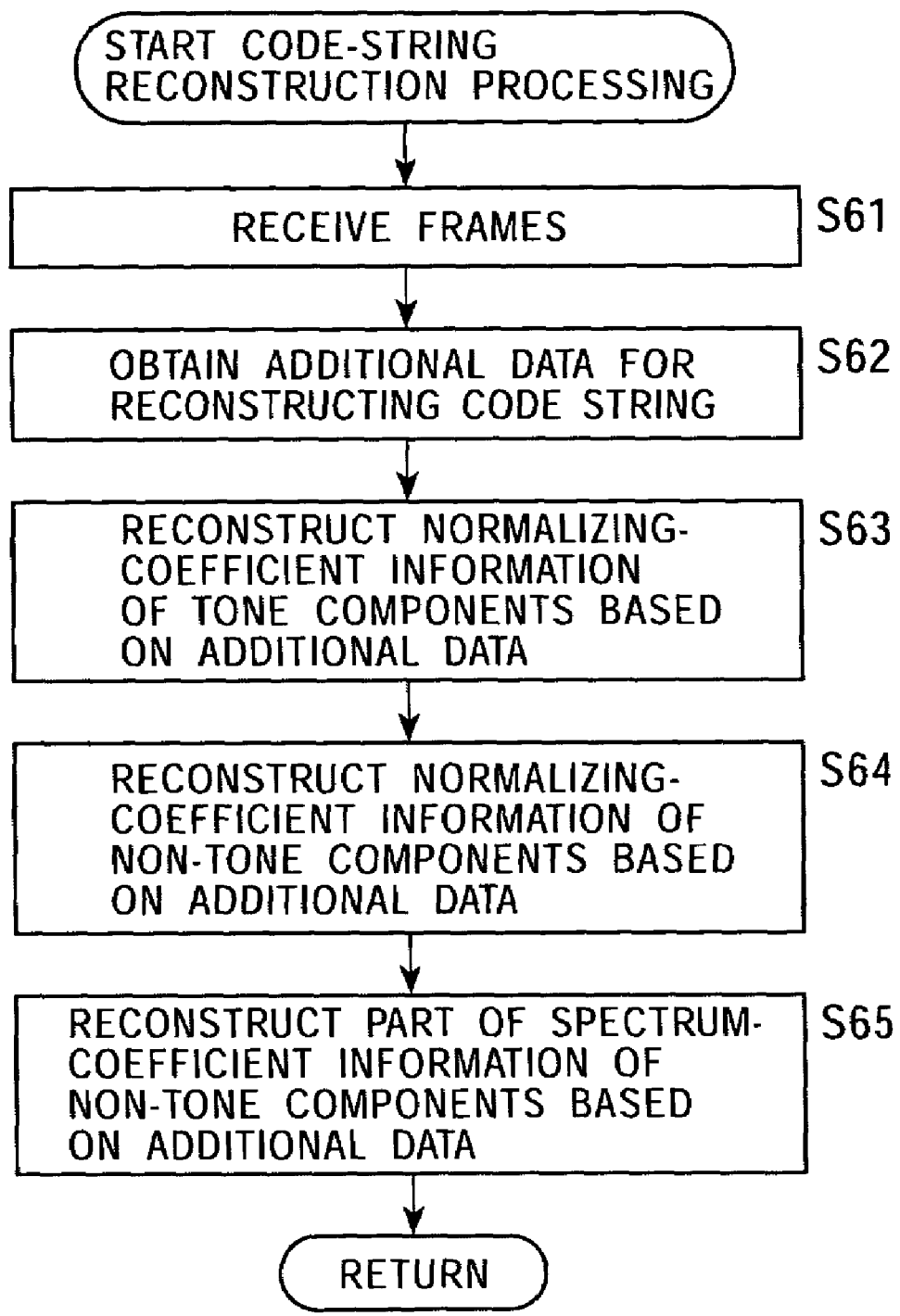
FIG. 25 is a flowchart illustrating code-string reconstruction processing.

According to the processing indicated by the flowchart of FIG. 25, high-quality coded frames can be reconstructed by using sample frames and additional frames.

The decoded sample data or the reconstructed and decoded original data by the processing shown in FIGS. 17 through 25 may be output via a speaker (not shown), or may be output to another device via, for example, a network.

A description is now given of processing for recording sample data in a recording medium or for reconstructing original data from sample data and additional data and recording the reconstructed original data in a recording medium.

Figure 26:
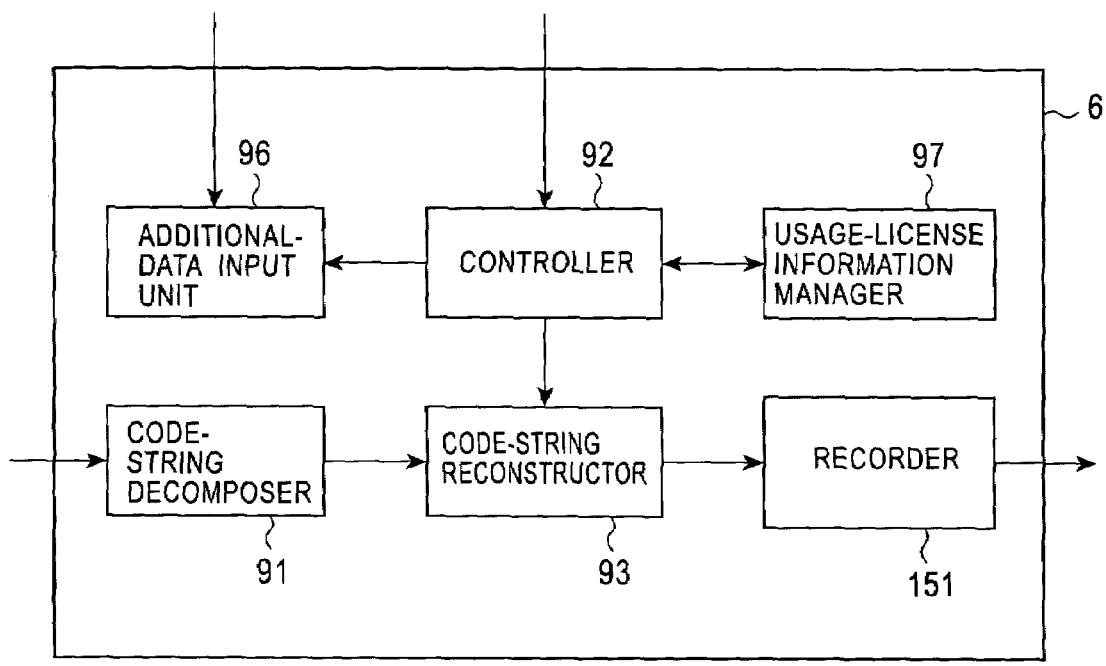
FIG. 26 is a block diagram illustrating the configuration of a data recording device to which the present invention is applied.

FIG. 26 is a block diagram illustrating the configuration of the data recording device 6.

In FIG. 26, elements corresponding to those of the data playback device 5 shown in FIG. 17 are indicated by like reference numerals, and an explanation thereof is thus omitted.

A code-string decomposer 91 receives sample frames and decomposes a code string so as to extract signal components. A controller 92 receives an operation from a user through an operation input unit (not shown) and determines whether the input sample data is to be recorded with high quality, i.e., whether the original data is to be reconstructed and recorded. The controller 92 then controls an additional-data input unit 96 to receive additional data, and supplies the additional frames to the code-string reconstructor 93.

When recording the input sample data, the code-string reconstructor 93 directly outputs the input sample frames to a recorder 151 under the control of the controller 92. When reconstructing and recording the original data, the code-string reconstructor 93 reconstructs, under the control of the controller 92, the coded frames of the original data from the input sample data by using the additional frames supplied from the controller 92, and outputs the reconstructed coded frames of the original data to the recorder 151.

When high-quality recording is performed, the code-string reconstructor 93 does not output the sample frames indicated in the erase frame zone of the additional frames to the recorder 151 based on the usage license information of the additional data. If coded frames indicated in the add frame zone, such as audio guide frames contained in the additional data, are supplied from the controller 92, the code-string reconstructor 93 outputs such coded frames to the recorder 151.

The recorder 151 records the data in a recording medium, for example, a magnetic disk, an optical disc, a magneto-optical disk, a semiconductor memory, or magnetic tape, according to a predetermined method. The recorder 151 may be a storage unit, such as a memory or a hard disk, provided for a substrate. For example, if the recorder 151 is able to record data in an optical disc, the recorder 151 is formed of an encoder for converting data into a format that is suitable for being recorded in an optical disc, an optical unit including a laser light source, such as a laser diode, various lenses, and a deflection beam splitter, a spindle motor for driving an optical disc, a driver for driving the optical unit to a predetermined track position of an optical disc, and a controller for controlling all the elements.

A recording medium loaded in the recorder 151 may be the same as the recording medium in which the sample data input into the code-string decomposer 91 or the additional data input into the controller 92 is recorded.

Figure 27:
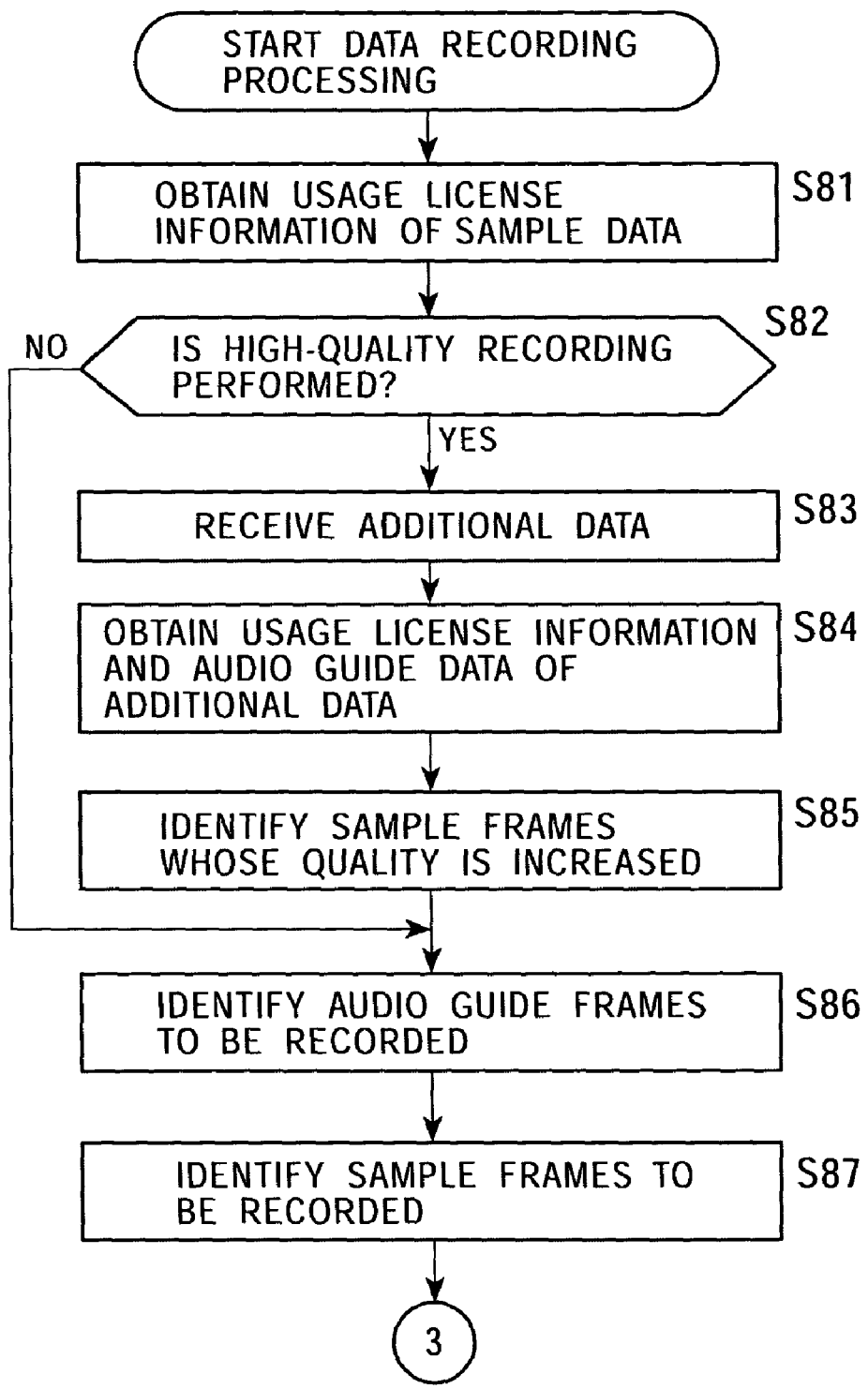
FIGS. 27 and 28 are a flowchart illustrating data recording processing.

Data recording processing performed by the data recording device 6 is described below with reference to the flowchart of FIGS. 27 and 28.

In step S81, the controller 92 obtains usage license information of sample data input into the data recording device 6.

In step S82, the controller 92 determines whether high-quality recording is performed. If the outcome of step S82 is no, the process proceeds to step S86. If it is determined in step S82 that high-quality recording is performed, the process proceeds to step S83.

In step S83, under the control of the controller 92, upon receiving additional data, if the additional data is encrypted, the additional-data input unit 96 decrypts the additional data, identifies usage license information, audio guide data, and additional frames, and supplies them to the controller 92.

In step S84, the controller 92 obtains the usage license information and the audio guide data from the additional-data input unit 96.

In step S85, the controller 92 identifies sample frames of the sample data whose quality should be increased based on the usage license information of the additional data obtained in step S84. In the example shown in FIG. 14, the sample frames M1 through M8 are identified as the coded frames whose quality should be increased.

In step S86, the controller 92 identifies audio guide frames to be recorded. That is, if high-quality recording is not performed, the controller 92 identifies audio guide frames to be recorded based on the usage license information of the sample data. In the example shown in FIG. 14, the audio guide frames G1 through G4 are identified as the coded frames to be recorded. If high-quality recording is performed, the controller 92 identifies audio guide frames to be recorded based on the usage license information of the additional data. In the example shown in FIG. 14, the audio guide frames G1' and G2' are identified as the coded frames to be recorded.

In step S87, the controller 92 identifies sample frames to be recorded. If high-quality recording is not performed, the controller 92 identifies sample frames to be recorded based on the usage license information of the sample data. In the example shown in FIG. 14, the sample frames M1 through M8 are identified as the coded frames to be recorded. If high-quality recording is performed, the controller 92 identifies sample frames to be recorded by increasing the quality based on the usage license information of the additional data. In the example shown in FIG. 14, the sample frames M1 through M8 are identified as the coded frames to be recorded by increasing the quality.

In step S88, the code-string decomposer 91 receives coded frames of the sample data. Then, in step S89, the code-string decomposer 91 decomposes an input code string and outputs the decomposed codes to the code-string reconstructor 93. In the example shown in FIG. 14, if high-quality recording is not performed, the audio guide frames G1 and G2, the sample frames M1 through M8, and the audio guide frames G3 and G4 are sequentially input. If high-quality recording is performed, the audio guide frames G1' and G2' and the sample frames M1 through M8 are sequentially input.

In step S90, the code-string reconstructor 93 determines whether the code string supplied from the code-string decomposer 91 indicates audio guide frames. If the outcome of step S90 is yes, the process proceeds to step S93. If the controller 92 supplies the audio guide frames contained in the additional data to the code-string reconstructor 93 based on the usage license information of the additional data, the outcome of step S90 also becomes yes, and the process proceeds to step S93.

Conversely, if it is determined in step S90 that the code string supplied to the code-string reconstructor 93 does not indicate audio guide frames, that is, if it is determined that the code string indicates sample frames, the process proceeds to step S91. In step S91, the controller 92 determines whether high-quality recording is performed. If the result of step S91 is no, the process proceeds to step S93. If the result of step S91 is yes, additional frames associated with the sample frames are supplied to the code-string reconstructor 93.

In step S92, the code-string reconstructor 93 performs the code-string reconstruction processing described with reference to the flowchart of FIG. 25 so as to reconstruct coded frames of the original data from the sample frames by using the additional frames supplied from the controller 92. In the example shown in FIG. 14, the sample frames M1 through M8 are sequentially supplied to the code-string reconstructor 93 from the code-string decomposer 91, and simultaneously, the additional frames S1 through S8 are sequentially supplied to the code-string reconstructor 93 from the controller 92.

If it is found in step S90 that the coded frames input into the code-string reconstructor 93 are audio guide frames, or if it is found in step S91 that high-quality recording is not performed, or after the code-string reconstruction processing in step S92, the process proceeds to step S93 in which the recorder 151 records the input code string into a recording medium loaded in the data recording device 6. In the example shown in FIG. 14, if high-quality recording is not performed, the audio guide frames G1 and G2, the sample frames M1 through M8, and the audio guide frames G3 and G4 are sequentially recorded. If high-quality recording is performed, the audio guide frames G1' and G2' and the high-quality coded frames C1 through C8 are sequentially recorded.

After step S93, the controller 92 determines in step S94 whether there is a coded frame to be recorded among the audio guide frames identified in step S86 or among the sample frames identified in step S87.

If it is determined in step S94 that there is a coded frame to be recorded, the process returns to step S88, and step S88 and the subsequent steps are repeated. If it is found in step S94 that there is no coded frame to be recorded, the process proceeds to step S95.

In step S95, if high-quality recording is not performed, the usage-license information manager 97 records the usage license information of the sample data obtained in step S81. If high-quality recording is performed, the usage-license information manager 97 updates and records the usage license information of the sample data obtained in step S81 based on the usage license information of the additional data obtained in step S84. High-quality recording processing is then completed. In the example shown in FIG. 14, if high-quality recording is not performed, the usage license information L1 is recorded, and if high-quality recording is performed, the usage license information L3 is recorded.

One important feature of the present invention is to add information in units of coded frames for playing back content data, and coded frames to be played back can be switched based on various conditions, such as the number of usages and the usage expiry date. For example, a plurality of items of audio guide data are inserted into content data as the coded frames, and are played back by being switched before and after the usage expiry date. This enables a user to know whether the content data can be played back.

Another important feature of the present invention is to erase part of coded frames from coded content data, or to add other coded frames. For example, when purchasing original data of the content, advertising audio data inserted into sample data can be erased, or commenting audio data can be added.

When distributing digital content, a content provider generates sample data in which part of original data is replaced by dummy data, and a small-amount additional data containing the true values of the dummy data, and adds usage license information and audio guide data to the sample data and the additional data. It is thus possible to achieve effective sales promotion while protecting the copyright. A content user is able to check in sound whether obtained sample data can be used or how to purchase the data. This is very convenient, and the user does not consider that the playback device has broken down even if the content data cannot be played back.

Additional data formed of additional frames containing true values (for example, true normalizing-coefficient information, true spectrum-coefficient information) of data replaced by dummy data when the sample data is generated is generated, thereby making it possible to reconstruct the original data from the sample data by using the additional data. The usage license information of the sample data can be updated based on the usage license information contained in the additional data.

By applying the present invention, sample data and reconstructed original data can be played back and output, or can be recorded in a recording medium, or output to another device via, for example, a network.

In the above-described embodiment, sample data and corresponding additional data are generated from audio-signal content data, and audio-signal original data is reconstructed from sample data and additional data, and is played back or recorded. In the present invention, content data may include image signals or image signals and audio signals.

The above-described series of processing may be executed by hardware or software. If software is used, the coding device 2, the data playback device 5, or the data recording device 6 may be formed of a personal computer 161 shown in FIG. 29.

Figure 29:
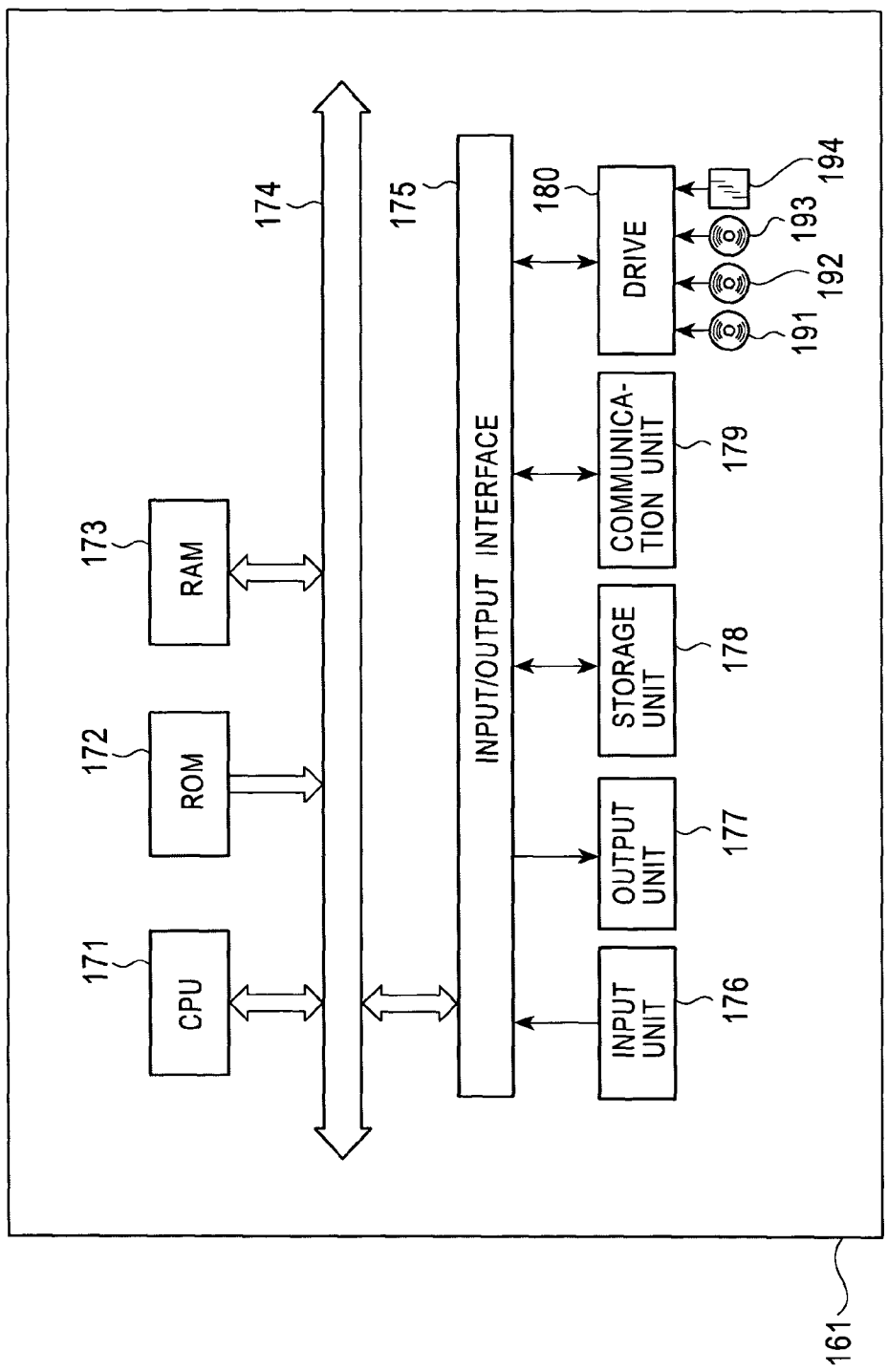
FIG. 29 is a block diagram illustrating the configuration of a personal computer.

In FIG. 29, a central processing unit (CPU) 171 executes various types of processing according to a program stored in a read only memory (ROM) 172 or a program loaded into a random access memory (RAM) 173. The RAM 173 also stores data required for executing various types of processing by the CPU 171.

The CPU 171, the ROM 172, and the RAM 173 are connected to each other via a bus 174. An input/output interface 175 is also connected to the bus 174.

The input/output interface 175 is also connected to an input unit 176 including, for example, a keyboard and a mouse, an output unit 177 including, for example, a display device and a speaker, a storage unit 178 formed of, for example, a hard disk, and a communication unit 179 including, for example, a modem and a terminal adapter. The communication unit 179 performs communication processing via a network including the Internet.

The input/output interface 175 is also connected to a drive 180. A recording medium, such as a magnetic disk 191, an optical disc 192, a magneto-optical disk 193, or a semiconductor memory 194, is loaded in the drive 180, and a computer program read from such a recording medium is installed into the storage unit 178.

If the above-described series of processing is executed by software, the software programs is installed via a network or a recording medium into a computer integrated in dedicated hardware, or into a computer, for example, a general-purpose personal computer, that is able to execute various functions by installing various programs.

Such a recording medium includes package media, such as the magnetic disk 191 (including floppy disks), the optical disc 192 (including compact disc read only memory (CD-ROM) and digital versatile disk (DVD)), the magneto-optical disk 193 (including mini disk (MD) (trademark)), and the semiconductor memory 194, which are distributed for supplying the programs to users. The recording medium also includes the ROM 172 and a hard disk contained in the storage unit 178 storing the programs therein, which are supplied to users while being integrated into the device.

In this specification, steps forming the programs stored in a recording medium include not only processing executed in chronological order, but also processing executed concurrently or individually.

What is claimed is:

1. A data transform method for transforming a first data string into a second data string, comprising:
    transforming data into frequency components;
    coding the frequency components;
    generating the first data string from the coded frequency components;
    replacing first data contained in the first data string with second data comprising spectrum coefficient information of the frequency components;
    generating the second data string using the second data; and
    adding, to the second data string, first usage license information indicating at least one condition for permitting the use of at least part of the second data string and indicating the second data string which is permitted to be used based on said at least one condition,
    wherein, when the second data string is used, the second data string which is permitted to be used is utilized based on the first usage license information.

2. A data transform method according to claim 1, further comprising adding a third data string which is not contained in the first data string to the second data string.

3. A data transform method according to claim 1, further comprising generating a fourth data string for reconstructing the first data string from the second data string,
    wherein the fourth data string includes data for reconstructing the first data.

4. A data transform method according to claim 3, wherein the fourth data string includes second usage license information indicating at least one condition for permitting the use of at least part of the first data string and indicating the first data string which is permitted to be used based on said at least one condition.

5. A data transform method according to claim 3, wherein the second data string includes a third data string and the fourth data string includes second usage license information for erasing at least part of the second data string containing the third data string.

6. A data transform method according to claim 3, wherein the fourth data string includes second usage license information for adding a fifth data string to the first data string.

7. A data transform method according to claim 1, wherein the first usage license information is encrypted and added to the second data string.

8. A data transform method according to claim 1, wherein said at least one condition includes at least one of information indicating the number of usages of the second data string, information indicating an expiry date of the second data string, information indicating a period for which the second data string is used, and information indicating a time for which the second data string is used.

9. A data transform method according to clam 1, wherein the first data is replaced by the second data so that the playback quality of the second data string is lower than the playback quality of the first data string.

10. A data transform method according to claim 1, wherein after coding, the first data includes at least one of normalizing-coefficient information, quantizing-precision information, and variable-length codes.

11. A data transform method according to claim 1, wherein the second data is data in which at least part of the first data is replaced by random data.

12. A data transform method according to claim 1, wherein the first data string and the second data string include audio data.

13. A data transform method according to claim 2, wherein the third data string includes audio data.

14. A data transform method according to claim 3, wherein the fourth data string includes audio data.

15. A data transform method according to claim 6, wherein the fifth data string includes audio data.

16. A data transform apparatus for transforming a first data string into a second data string, comprising:

transforming means for transforming data into frequency components;

coding means for coding the frequency components;

generating means for generating the first data string from the coded frequency components;

replacement means for replacing first data contained in the first data string with second data comprising spectrum coefficient information of the frequency components;

generation means for generating the second data string using the second data; and usage-license-information addition means for adding, to the second data string, usage license information indicating at least one condition for permitting the use of at least part of the second data string and indicating the second data string which is permitted to be used based on said at least one condition, wherein, when the second data string is used, the second data string which is permitted to be used is utilized based on the usage license information.

17. A recording medium storing a program to cause an information-processing apparatus to perform a method for controlling a data transform apparatus that transforms a first data string into a second data string, the method comprising:

transforming data into frequency components;

coding the frequency components;

generating the first data string from the coded frequency components;

replacing first data contained in the first data string with second data comprising spectrum coefficient information of the frequency components;

generating the second data string using the second data; and adding, to the second data string, usage license information indicating at least one condition for permitting the use of at least part of the second data string and indicating the second data string which is permitted to be used based on said at least one condition, wherein, when the second data string is used, the second data string which is permitted to be used is utilized based on the usage license information.

* * * * *